(12) United States Patent
Maeda et al.

(10) Patent No.: US 9,726,277 B2
(45) Date of Patent: Aug. 8, 2017

(54) HYDRAULIC CONTROL DEVICE OF AUTOMATIC TRANSMISSION

(71) Applicant: AISIN AW CO., LTD., Anjo-shi, Aichi-ken (JP)

(72) Inventors: Yoshihiro Maeda, Nagoya (JP); Nobuyuki Hirai, Anjo (JP); Masamichi Yamaguchi, Anjo (JP); Yoshimitsu Hyodo, Nishio (JP); Kenichi Tsuchida, Nishio (JP); Hiroyuki Kutsubo, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/100,855

(22) PCT Filed: Dec. 26, 2014

(86) PCT No.: PCT/JP2014/084517
§ 371 (c)(1),
(2) Date: Jun. 1, 2016

(87) PCT Pub. No.: WO2015/099125
PCT Pub. Date: Jul. 2, 2015

(65) Prior Publication Data
US 2016/0377175 A1 Dec. 29, 2016

(30) Foreign Application Priority Data

Dec. 26, 2013 (JP) ................................. 2013-270422
Jan. 24, 2014 (JP) ................................. 2014-011873
Mar. 3, 2014 (JP) ................................. 2014-040477

(51) Int. Cl.
*F16H 31/00* (2006.01)
*F16H 61/02* (2006.01)
(Continued)

(52) U.S. Cl.
CPC ..... *F16H 61/0206* (2013.01); *F16H 61/0021* (2013.01); *F16H 61/0251* (2013.01);
(Continued)

(58) Field of Classification Search
CPC ............. F16H 61/0206; F16H 61/0021; F16H 61/0251; F16H 2200/201;
(Continued)

(56) References Cited

U.S. PATENT DOCUMENTS 8,096,915 B2    1/2012  Wittkopp et al.
9,008,930 B2 *  4/2015  Saito ....................... F16H 61/12
                                                          701/55
(Continued)

FOREIGN PATENT DOCUMENTS

JP    2007-064400 A    3/2007
JP    2009-052618 A    3/2009
(Continued)

OTHER PUBLICATIONS

Mar. 24, 2015 Search Report issued in International Patent Application No. PCT/JP2014/084517.

*Primary Examiner* — David J Hlavka
(74) *Attorney, Agent, or Firm* — Oliff PLC

(57) ABSTRACT

A hydraulic control device that includes a solenoid valve capable of supplying a first engagement pressure to the first engagement element; and a first cut valve that is interposed in an oil passage from the solenoid valve to the first engagement element and is capable of cutting off supply of a hydraulic pressure to the first engagement element, wherein only the first engagement pressure and a second engagement pressure serve as hydraulic pressures that act such that the first cut valve cuts off the supply of the hydraulic pressure to the first engagement element, and the first cut valve is switched so as to cut off the supply of the (Continued)

hydraulic pressure to the first engagement element when the first engagement pressure and the second engagement pressure are simultaneously supplied to the first engagement element and the second engagement element, respectively.

9 Claims, 7 Drawing Sheets

(51) Int. Cl.
*F16H 61/00* (2006.01)
*F16K 31/06* (2006.01)
*F16H 61/686* (2006.01)
*F16H 3/66* (2006.01)

(52) U.S. Cl.
CPC .............. *F16K 31/06* (2013.01); *F16H 3/663* (2013.01); *F16H 61/686* (2013.01); *F16H 2200/0069* (2013.01); *F16H 2200/201* (2013.01); *F16H 2200/2046* (2013.01)

(58) Field of Classification Search
CPC ..... F16H 2200/0069; F16H 2200/2046; F16H 3/663; F16H 61/686; F16K 31/06
See application file for complete search history.

(56) References Cited

U.S. PATENT DOCUMENTS

| | | | |
|---|---|---|---|
| 9,242,649 B2* | 1/2016 | Kim | F16D 48/06 |
| 2004/0018913 A1* | 1/2004 | Okamoto | F16H 61/143 477/62 |
| 2004/0058779 A1* | 3/2004 | Ayabe | B60W 10/06 477/121 |
| 2007/0021260 A1* | 1/2007 | Nozaki | F16H 61/12 475/119 |
| 2007/0129214 A1* | 6/2007 | Kondo | F16H 61/0437 477/144 |
| 2009/0312132 A1 | 12/2009 | Saitou et al. | |
| 2010/0056334 A1* | 3/2010 | Toi | F16H 61/12 477/158 |
| 2010/0229969 A1 | 9/2010 | Ishikawa et al. | |
| 2013/0261910 A1 | 10/2013 | Ichikawa et al. | |
| 2013/0319555 A1 | 12/2013 | Ishikawa et al. | |

FOREIGN PATENT DOCUMENTS

| | | |
|---|---|---|
| JP | 2009-299723 A | 12/2009 |
| JP | 2010-210012 A | 9/2010 |
| JP | 2012-207721 A | 10/2012 |
| JP | 2013-204684 A | 10/2013 |

* cited by examiner

FIG.2

|  | C1 | C2 | C3 | C4 | B1 | B2in | B2out |
|---|---|---|---|---|---|---|---|
| Rev |  | O | O |  |  | O | (O) |
| P, N |  | O |  |  |  | O | (O) |
| 1st | O | O |  |  |  | O | (O) |
| 2nd | O |  |  |  | O | O | (O) |
| 3rd |  | O |  |  | O | O | (O) |
| 4th |  |  |  | O | O | O |  |
| 5th |  | O |  | O | O |  |  |
| 6th | O |  |  | O | O |  |  |
| 7th | O |  | O | O |  |  |  |
| 7th |  | O | O | O |  |  |  |
| 7th | O | O |  | O |  |  |  |
| 7th | O | O | O |  |  |  |  |
| 8th |  |  | O | O | O |  |  |
| 9th | O |  | O |  | O |  |  |
| 10th |  | O | O |  | O |  |  |

HYDRAULIC CONTROL DEVICE OF AUTOMATIC TRANSMISSION

BACKGROUND

The present disclosure relates to a hydraulic control device of an automatic transmission including a plurality of engagement elements that is mounted, for example, on a vehicle, and more in detail, to a hydraulic control device of an automatic transmission that can cut off the supply pressure for a predetermined one of a plurality of predetermined engagement elements such that the engagement elements are prevented from simultaneously being engaged.

Conventionally, in a stepped automatic transmission mounted, for example, on a vehicle, a hydraulic control device controls engagement states of a plurality of engagement elements (clutches and brakes) to establish a transmission path in a speed change mechanism at each shift speed, so that multi-speed transmission is achieved. To avoid a tie-up in which engagement elements that should not normally be simultaneously engaged are engaged in the speed change mechanism, a hydraulic control device as described above is known which includes a hydraulic circuit that is provided with a plurality of cut-off valves for the respective engagement elements and does not supply hydraulic pressure under certain conditions (refer to Japanese Patent Application Publication No. 2009-52618). An automatic transmission of Japanese Patent Application Publication No. 2009-52618 includes two clutches and three brakes, and the two clutches and two of the brakes are each provided with a cut-off valve, thus, in total, four cut-off valves.

In recent years, an automatic transmission has been developed which includes four clutches and two brakes and is capable of establishing ten forward speeds by simultaneously engaging three friction engagement elements (refer to U.S. Pat. No. 8,096,915).

SUMMARY

However, the automatic transmission of Japanese Patent Application Publication No. 2009-52618 includes the cut-off valves for four of the five engagement elements. If the cut-off valves described in Japanese Patent Application Publication No. 2009-52618 are provided in the automatic transmission having the four clutches and the two brakes and being capable of establishing the ten forward speeds described in U.S. Pat. No. 8,096,915, the number of the cut-off valves further increases, thus causing an increase in the number of components and size of the automatic transmission.

Each gear train of a speed change mechanism to be applied in an automatic transmission has a unique characteristic. For example, the automatic transmission having the four clutches and the two brakes described in U.S. Pat. No. 8,096,915 includes an engagement element that is engaged at lower shift speeds and disengaged at higher shift speeds and an engagement element that is, in contrast, engaged at higher shift speeds and disengaged at lower shift speeds, during a forward travel. If these engagement elements are simultaneously engaged during the forward travel, large deceleration may be generated. Hence, when the cut-off valves described in Japanese Patent Application Publication No. 2009-52618 are provided, it is desirable to provide the cut-off valves with arrangement and number appropriately corresponding to the characteristic of the gear train.

Consequently, an exemplary aspect of the present disclosure aims at providing a hydraulic control device of an automatic transmission that can be provided with a hydraulic pressure cut valve for preventing a tie-up in which engagement elements that should not normally be simultaneously engaged are engaged, without causing an increase in the number of components and the size of the automatic transmission, and that appropriately corresponds to the characteristic of the gear train with a simple structure, even when the automatic transmission is capable of establishing ten forward speeds.

According to an exemplary aspect of the disclosure, a hydraulic control device of an automatic transmission including: a first engagement element that is hydraulically operated and is engaged when lower forward shift speeds are established; a second engagement element that is hydraulically operated and is engaged when at least forward shift speeds other than the lower forward shift speeds are established; and third to sixth engagement elements that are hydraulically operated, the first engagement element and the second engagement element being engagement elements that are not simultaneously engaged when the forward shift speeds are established, and a plurality of shift speeds capable of being established by selectively engaging three of the first to the sixth engagement elements, the hydraulic control device including: a solenoid valve capable of supplying a first engagement pressure to the first engagement element; and a first cut valve that is interposed in an oil passage from the solenoid valve to the first engagement element and is capable of cutting off supply of a hydraulic pressure to the first engagement element, wherein only the first engagement pressure and a second engagement pressure serve as hydraulic pressures that act such that the first cut valve cuts off the supply of the hydraulic pressure to the first engagement element, and the first cut valve is switched so as to cut off the supply of the hydraulic pressure to the first engagement element when the first engagement pressure and the second engagement pressure are simultaneously supplied to the first engagement element and the second engagement element, respectively.

Accordingly, the first cut valve is switched so as to cut off the supply of the hydraulic pressure to the first engagement element when the first engagement pressure and the second engagement pressure are simultaneously supplied to the first engagement element and the second engagement element, respectively. As a result, the tie-up can be effectively suppressed at the shift speeds involving the first engagement element (that is, the engagement of an engagement element having a large torque capacity) to be engaged at the lower shift speeds such as the first forward speed and that may cause large deceleration. In the case of an automatic transmission that normally establishes shift speeds by engaging three engagement elements with respect to the characteristic of the gear train including the first engagement element to be engaged when the lower forward shift speeds are established and the second engagement element to be engaged when at least the forward shift speeds other than the lower forward shift speeds are established, the cut valve is normally structured to cut off the hydraulic pressure when four engagement elements are supplied with hydraulic pressures. However, the cut valve according to the above aspect of the present disclosure can be structured to cut off the hydraulic pressure by only supplying the hydraulic pressures to the two engagement elements. Thus, the hydraulic control device of the automatic transmission can be obtained with a simple structure that appropriately corresponds to the characteristic of the gear train. As a result, even if the number of engagement elements is increased in order to establish multiple shift speeds, the hydraulic pressure cut valve can be provided without causing an increase in the number of components thereof or an increase in the size thereof.

BRIEF DESCRIPTION OF THE DRAWINGS

FIG. 2 is an engagement table of the automatic transmission according to the first embodiment.

DETAILED DESCRIPTION OF EMBODIMENTS

Figure 1:
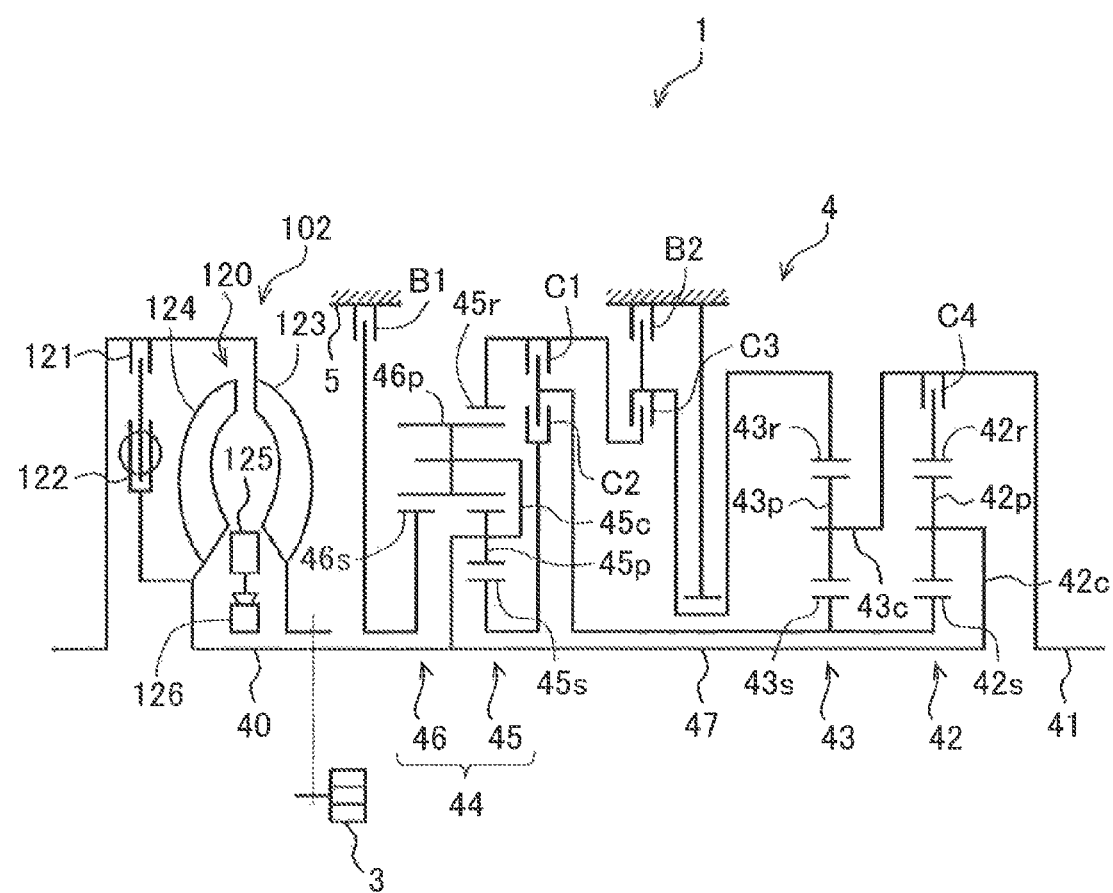
FIG. 1 is a skeleton diagram showing an automatic transmission according to a first embodiment.

Embodiments according to the present disclosure will be described with reference to FIGS. 1 to 7.

First Embodiment

First, a schematic structure of an automatic transmission 1 serving as an automatic transmission to which the present disclosure can be applied will be described with reference to FIGS. 1 to 3. The automatic transmission 1 according to the embodiment is connected to a crankshaft of an engine (internal combustion engine) or a rotor of an electric motor (not shown) serving as a driving source longitudinally mounted at the front of a rear wheel drive vehicle, and is capable of transmitting power (torque) from the engine or the like to right and left wheels (driving wheels) (not shown). The automatic transmission 1 includes a starting device (fluid transmission apparatus) 102, an oil pump 3, a speed change mechanism 4 for changing the speed of the power transmitted from the engine or the like to an input shaft (input member) 40 and transmitting the power to an output shaft (output member) 41, and a transmission case 5 for accommodating these components.

The starting device 102 includes a torque converter 120, a lock-up clutch 121 that can connect and disconnect a front cover coupled to, for example, the crankshaft of the engine to and from the input shaft 40 of the automatic transmission 1, and a damper mechanism 122 for attenuating vibrations between the front cover and the input shaft 40 of the automatic transmission 1. The torque converter 120 includes a pump impeller 123 on the input side that is coupled to the front cover, a turbine runner 124 on the output side that is coupled with the input shaft 40, a stator 125 that is placed inside the pump impeller 123 and the turbine runner 124 and regulates the flow of hydraulic oil from the turbine runner 124 to the pump impeller 123, and a one-way clutch 126 that is supported by a stator shaft (not shown) and limits the direction of rotation of the stator 125 to one direction. The torque converter 120 may be a fluid coupling that does not include the stator 125.

The oil pump 3 is structured as a gear pump that includes, for example, a pump assembly including a pump body and a pump cover, an external gear (inner rotor) coupled to the pump impeller 123 of the torque converter 120 via a chain or a gear train, and an internal gear (outer rotor) meshing with the external gear. The oil pump 3 is driven by the power from the engine or the like to suction hydraulic oil stored in an oil pan (not shown) and to pressure-feed the hydraulic oil to a hydraulic control device 100 (to be described later).

The speed change mechanism 4 is structured as a ten-speed transmission, and includes the input shaft 40, the output shaft 41 coupled to the right and left wheels via a differential gear and drive shafts (not shown), single-pinion type first and second planetary gears 42 and 43 that are arranged side by side in the axial direction of the input shaft 40 and the output shaft 41, and a planetary gear set 44 that is a Ravigneaux type planetary gear mechanism structured by combining a double-pinion type planetary gear with a single-pinion type planetary gear. To change a power transmission path from the input shaft 40 to the output shaft 41, the speed change mechanism 4 includes the following six friction engagement elements: a first clutch (third engagement element) C1, a second clutch (fourth engagement element) C2, a third clutch (second engagement element) C3, a fourth clutch (fifth engagement element) C4, a first brake (sixth engagement element) B1, and a second brake (first engagement element) B2. In the present embodiment, a hydraulic servo for operating the second brake B2 includes two oil chambers of an inner chamber and an outer chamber. Consequently, the second brake B2 is operated by a hydraulic servo 76 (first engagement oil chamber, also denoted as B2in or B2$i$) using the inner chamber and a hydraulic servo 77 (second engagement oil chamber, also denoted as B2out or B2$o$) using the outer chamber (refer to FIG. 4).

In the present embodiment, the first and the second planetary gears 42 and 43 and the planetary gear set 44 are placed in the transmission case 5 so as to be arranged in the order of the planetary gear set 44, the second planetary gear 43, and the first planetary gear 42 from the starting device 102 side, that is, from the engine side (from the left side in FIG. 1). Accordingly, the planetary gear set 44 is placed on the front side of the vehicle so as to be closer to the starting device 102, the first planetary gear 42 is placed on the rear side of the vehicle so as to be closer to the output shaft 41, and the second planetary gear 43 is placed between the planetary gear set 44 and the first planetary gear 42.

The first planetary gear 42 includes a first sun gear 42$s$ serving as an external gear, a first ring gear 42$r$ serving as an internal gear arranged concentrically with the first sun gear 42$s$, a plurality of first pinion gears 42$p$ each meshing with the first sun gear 42$s$ and the first ring gear 42$r$, and a first carrier 42$c$ rotatably (turnably) and revolvably supporting the first pinion gears 42$p$. In the present embodiment, a gear ratio $\lambda 1$ (the number of teeth of the first sun gear 42$s$/the number of teeth of the first ring gear 42$r$) of the first planetary gear 42 is set, for example, $\lambda 1=0.277$.

The first carrier 42$c$ of the first planetary gear 42 is constantly coupled (fixed) to an intermediate shaft 47 of the automatic transmission 1 coupled to the input shaft 40. As a result, the power from the engine or the like is always transmitted to the first carrier 42$c$ via the input shaft 40 and the intermediate shaft 47 while the power is transmitted from the engine or the like to the input shaft 40. The first carrier 42$c$ serves as an input element of the first planetary gear 42 while the fourth clutch C4 is engaged, and idles while the fourth clutch C4 is disengaged. The first ring gear 42$r$ serves as an output element of the first planetary gear 42 while the fourth clutch C4 is engaged.

The second planetary gear 43 includes a second sun gear 43$s$ serving as an external gear, a second ring gear 43$r$ serving as an internal gear arranged concentrically with the second sun gear 43$s$, a plurality of second pinion gears 43$p$ each meshing with the second sun gear 43s and the second ring gear 43r, and a second carrier (planetary carrier) 43c rotatably (turnably) and revolvably supporting the second pinion gears 43p. In the present embodiment, a gear ratio λ2 (the number of teeth of the second sun gear 43s/the number of teeth of the second ring gear 43r) of the second planetary gear 43 is set so that, for example, λ2=0.244.

The second sun gear 43s of the second planetary gear 43 is integrated (constantly coupled) with the first sun gear 42s of the first planetary gear 42, and constantly rotates or stops together (and coaxially) with the first sun gear 42s. The first sun gear 42s and the second sun gear 43s may, however, be structured as separate bodies and constantly coupled to each other via a coupling member (not shown). The second carrier 43c of the second planetary gear 43 is constantly coupled to the output shaft 41, and rotates or stops together (and coaxially) with the output shaft 41. As a result, the second carrier 43c serves as an output element of the second planetary gear 43. Moreover, the second ring gear 43r of the second planetary gear 43 serves as a fixable element of the second planetary gear 43.

The planetary gear set 44 is a compound planetary gear mechanism structured by combining a third planetary gear 45 that is a double-pinion type planetary gear with a fourth planetary gear 46 that is a single-pinion type planetary gear. The respective planetary gears are placed in the transmission case 5 so as to be arranged from the engine side in the order of the fourth planetary gear 46, the third planetary gear 45, the second planetary gear 43, and the first planetary gear 42.

The planetary gear set 44 includes a third sun gear 45s and a fourth sun gear 46s serving as external gears, a third ring gear 45r serving as an internal gear arranged concentrically with the third and the fourth sun gears 45s and 46s, a plurality of third pinion gears (short pinion gears) 45p meshing with the third sun gear 45s, a plurality of fourth pinion gears (long pinion gears) 46p meshing with the fourth sun gear 46s and the third pinion gears 45p and also meshing with the third ring gear 45r, and a third carrier 45c rotatably (turnably) and revolvably supporting the third pinion gears 45p and the fourth pinion gears 46p.

The third planetary gear 45 is constituted by the third sun gear 45s, the third carrier 45c, the third pinion gears 45p, the fourth pinion gears 46p, and the third ring gear 45r. The fourth planetary gear 46 is constituted by the fourth sun gear 46s, the third carrier 45c, the fourth pinion gears 46p, and the third ring gear 45r. In the present embodiment, the planetary gear set 44 is structured such that the third planetary gear 45 has a gear ratio λ3 (the number of teeth of the third sun gear 45s/the number of teeth of the third ring gear 45r) of, for example, 0.488, and the fourth planetary gear 46 has a gear ratio λ4 (the number of teeth of the fourth sun gear 46s/the number of teeth of the third ring gear 45r) of, for example, 0.581.

The fourth sun gear 46s among rotational elements constituting the planetary gear set 44 serves as a fixable element of the planetary gear set 44. In addition, the third carrier 45c is constantly coupled (fixed) to the input shaft 40, and also constantly coupled to the first carrier 42c of the first planetary gear 42 via the intermediate shaft 47. As a result, the power from the engine or the like is constantly transmitted to the third carrier 45c via the input shaft 40 while the power is transmitted from the engine or the like to the input shaft 40. Accordingly, the third carrier 45c serves as an input element of the planetary gear set 44. The third ring gear 45r serves as a first output element of the planetary gear set 44, and the third sun gear 45s serves as a second output element of the planetary gear set 44.

The first clutch C1 connects and disconnects the first sun gear 42s of the first planetary gear 42, which is constantly coupled to the second sun gear 43s of the second planetary gear 43, to and from the third ring gear 45r of the planetary gear set 44. The second clutch C2 connects and disconnects the first sun gear 42s of the first planetary gear 42, which is constantly coupled to the second sun gear 43s of the second planetary gear 43, to and from the third sun gear 45s of the planetary gear set 44. The third clutch C3 connects and disconnects the second ring gear 43r of the second planetary gear 43 to and from the third ring gear 45r of the planetary gear set 44. The fourth clutch C4 connects and disconnects the first ring gear 42r of the first planetary gear 42 to and from the output shaft 41.

The first brake B1 unrotatably holds (connects) the fourth sun gear 46s of the planetary gear set 44 stationary to the transmission case 5, and rotatably releases the fourth sun gear 46s held stationary from the transmission case 5. The second brake B2 unrotatably holds (connects) the second ring gear 43r of the second planetary gear 43 stationary to the transmission case 5, and rotatably releases the second ring gear 43r held stationary from the transmission case 5.

The present embodiment employs, as each of the first to fourth clutches C1 to C4, a multi-plate friction hydraulic clutch that includes a piston, a plurality of friction engagement plates (such as friction plates each structured by attaching friction materials to both surfaces of an annular member and separator plates that is each an annular member with both surfaces smoothly formed), and a hydraulic servo constituted by, for example, an engagement oil chamber and a centrifugal hydraulic pressure canceling chamber each supplied with hydraulic oil. The present embodiment also employs, as each of the first and the second brakes B1 and B2, a multi-plate friction hydraulic brake that includes a piston, a plurality of friction engagement plates (friction plates and separator plates), and a hydraulic servo constituted by, for example, an engagement oil chamber supplied with the hydraulic oil. The first to the fourth clutches C1 to C4 and the first and the second brakes B1 and B2 operate in response to supply and discharge of the hydraulic oil by the hydraulic control device 100.

FIG. 2 is an engagement table showing relations between shift speeds of the speed change mechanism 4 and operating states of the first to the fourth clutches C1 to C4 and the first and the second brakes B1 and B2. FIG. 3 shows velocity diagrams representing ratios of rotational speeds of the respective rotational elements to the rotational speed of the input shaft 40 (where the rotational speed of the input shaft 40, that is, the first carrier 42c and the third carrier 45c, is assumed to have a value of 1).

Figure 3:
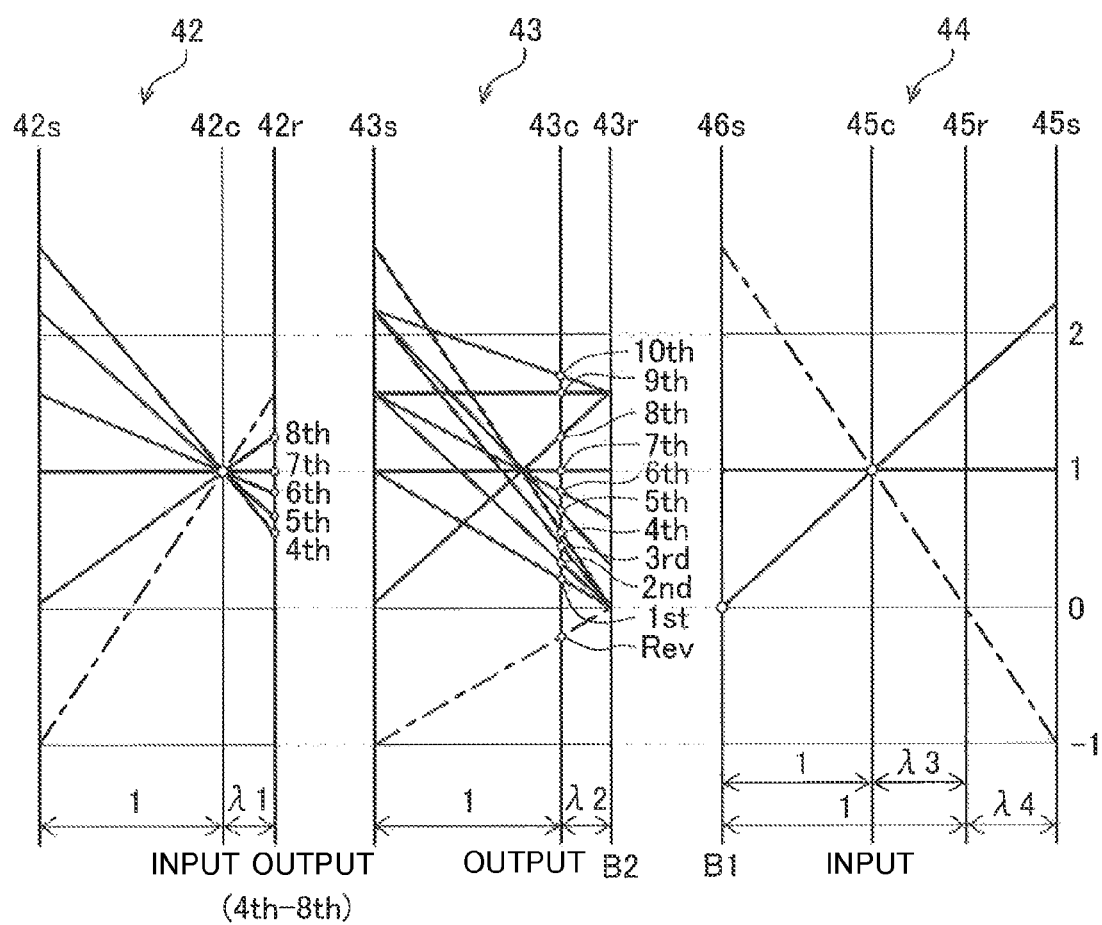
FIG. 3 shows velocity diagrams of the automatic transmission according to the first embodiment.

As shown in FIG. 3, in a velocity diagram of the first planetary gear 42 (velocity diagram on the left side in FIG. 3), three rotational elements, that is, the first sun gear 42s, the first ring gear 42r, and the first carrier 42c constituting the single-pinion type first planetary gear 42 are arranged from the left side in the velocity diagram in the order of the first sun gear 42s, the first carrier 42c, and the first ring gear 42r, at intervals corresponding to the gear ratio λ1. According to the order of arrangement in the velocity diagram described above, the first sun gear 42s is referred to as a first rotational element of the automatic transmission 1, the first carrier 42c is referred to as a second rotational element of the automatic transmission 1, and the first ring gear 42r is referred to as a third rotational element of the automatic transmission 1, in the present embodiment. Accordingly, the first planetary gear 42 includes the first rotational element, the second rotational element, and the third rotational element of the automatic transmission 1 that are sequentially arranged at intervals corresponding to the gear ratio λ1 in the velocity diagram.

In a velocity diagram of the second planetary gear 43 (velocity diagram at the center in FIG. 3), three rotational elements, that is, the second sun gear 43s, the second ring gear 43r, and the second carrier 43c constituting the single-pinion type second planetary gear 43 are arranged from the left side in the velocity diagram in the order of the second sun gear 43s, the second carrier 43c, and the second ring gear 43r, at intervals corresponding to the gear ratio λ2. According to the order of arrangement in the velocity diagram described above, the second sun gear 43s is referred to as a fourth rotational element of the automatic transmission 1, the second carrier 43c is referred to as a fifth rotational element of the automatic transmission 1, and the second ring gear 43r is referred to as a sixth rotational element of the automatic transmission 1, in the present embodiment. Accordingly, the second planetary gear 43 includes the fourth rotational element, the fifth rotational element, and the sixth rotational element of the automatic transmission 1 that are sequentially arranged at intervals corresponding to the gear ratio λ2 in the velocity diagram.

In addition, in a velocity diagram of the planetary gear set 44 (velocity diagram on the right side in FIG. 3), four rotational elements, that is, the fourth sun gear 46s, the third carrier 45c, the third ring gear 45r, and the third sun gear 45s constituting the planetary gear set 44 are arranged in this order from the left side in the velocity diagram, at intervals corresponding to the gear ratio λ3 of the single-pinion type third planetary gear 45 and the gear ratio λ4 of the double-pinion type fourth planetary gear 46. According to the order of arrangement in the velocity diagram described above, the fourth sun gear 46s is referred to as a seventh rotational element of the automatic transmission 1, the third carrier 45c is referred to as an eighth rotational element of the automatic transmission 1, the third ring gear 45r is referred to as a ninth rotational element of the automatic transmission 1, and the third sun gear 45s is referred to as a tenth rotational element of the automatic transmission 1, in the present embodiment. Accordingly, the planetary gear set 44 includes the seventh rotational element, the eighth rotational element, the ninth rotational element, and the tenth rotational element of the automatic transmission 1 that are sequentially arranged at intervals corresponding to the gear ratios λ3 and λ4 in the velocity diagram.

The automatic transmission 1 structured as described above engages and disengages the first to the fourth clutches C1 to C4 and the first and the second brakes B1 and B2 shown in the skeleton diagram of FIG. 1 according to the combinations shown in the engagement table of FIG. 2. Therefore, a first forward speed (1st) to a tenth forward speed (10th) and one reverse speed (Rev) are established at rotational speed ratios shown in the velocity diagrams of FIG. 3.

The seventh forward speed is established by engaging the first, the third, and the fourth clutches C1, C3, and C4, and disengaging the remaining engagement elements, that is, the second clutch C2 and the first and the second brakes B1 and B2. Specifically, the seventh forward speed is established as follows: the first clutch C1 connects the first sun gear 42s of the first planetary gear 42 and the second sun gear 43s of the second planetary gear 43 to the third ring gear 45r of the planetary gear set 44; the third clutch C3 connects the second ring gear 43r of the second planetary gear 43 to the third ring gear 45r of the planetary gear set 44; and moreover, the fourth clutch C4 connects the first ring gear 42r of the first planetary gear 42 to the output shaft 41. The seventh forward speed requires neither the first brake B1 nor the second brake B2 to be engaged, so that a direct coupling speed is established. Consequently, the seventh forward speed is established by engaging any three of the four clutches (refer to FIG. 2). In the present embodiment, a gear ratio γ7 at the seventh forward speed results in 1.000.

The automatic transmission 1 is mounted on the vehicle, such as an automobile, and the vehicle includes an ECU (not shown) that can control operations of, for example, the engagement elements by electrically controlling the hydraulic control device 100.

Next, the hydraulic control device 100 of the automatic transmission 1 according to the present disclosure will be described. First, the entire hydraulic control device 100 will be generally described with reference to FIG. 4. In the present embodiment, each valve actually has one spool, but, for the purpose of explaining a spool position, such as a switching position or a control position, a state in the right half of the spool shown in each of FIGS. 4 to 7 is called a "right-half position", and a state in the left half thereof is called a "left-half position".

Figure 4:
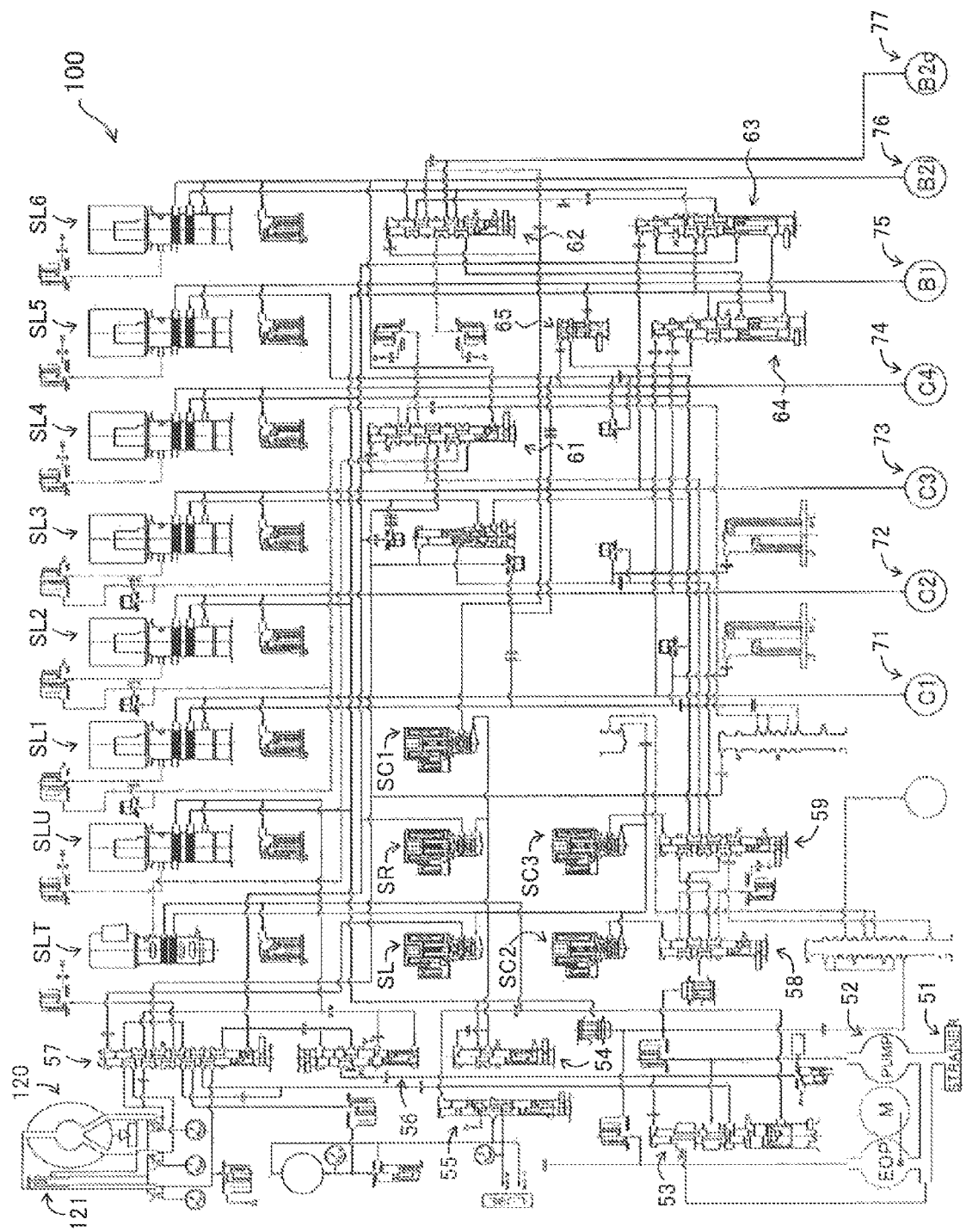
FIG. 4 is a schematic diagram showing an entire hydraulic control device according to the first embodiment.

As shown in FIG. 4, the hydraulic control device 100 includes a strainer 51, an oil pump 52, a primary regulator valve 53, a solenoid modulator valve 54, and a linear solenoid valve SLT that are mainly used to regulate and generate hydraulic pressures serving as various source pressures.

The hydraulic control device 100 also includes, for example, a lubrication relay valve 55, a circulation modulator valve 56, a lock-up relay valve 57, a sequence valve 61, a first B2 apply control valve (switching valve) 62, a second B2 apply control valve (first cut valve) 63, and a signal pressure switching valve (second cut valve) 64. The spool position of each of those valves is switched or controlled for selectively switching the hydraulic pressures based on the various source pressures to respective oil passages thereof or regulating the hydraulic pressures.

In addition, the hydraulic control device 100 includes a linear solenoid valve SL1, a linear solenoid valve SL2, a linear solenoid valve SL3, a linear solenoid valve SL4, a linear solenoid valve SL5, a linear solenoid valve (solenoid valve) SL6, a linear solenoid valve SLU, a solenoid valve SL, a solenoid valve SR, a solenoid valve (signal solenoid valve) SC1, a solenoid valve SC2, and a solenoid valve SC3 that are used to electrically control and supply the hydraulic pressures to the various relay valves or control valves described above.

In the hydraulic control device 100, for each of the solenoid valves except the solenoid valves SL and SR, that is, the linear solenoid valves SL1 to SL6 and SLU and the solenoid valves SC1 to SC3, what is called a normally closed (N/C) type valve, is employed which cuts off communication between an input port and an output port when electricity is not conducted (hereinafter, also called an OFF state) and communicates the input and output ports when electricity is conducted (hereinafter, also called an ON state), whereas, in contrast, for each of the solenoid valves SL and SR, a normally open (N/O) type valve is employed.

The solenoid valve SC1 is turned ON at the first to the third forward speeds. The hydraulic control device 100 includes a first supply cut-off valve 58 that is switched by the solenoid valve SC2 and a second supply cut-off valve 59 that is switched by the solenoid valve SC3. The solenoid valves SC2 and SC3 can perform switching between travel ranges by switching the first and the second supply cut-off valves 58 and 59 in response to shift-by-wire control.

The hydraulic control device 100 is structured by including a hydraulic servo 71 that can engage and disengage the first clutch C1, a hydraulic servo 72 that can engage and disengage the second clutch C2, a hydraulic servo 73 that can engage and disengage the third clutch C3, a hydraulic servo 74 that can engage and disengage the fourth clutch C4, a hydraulic servo 75 that can engage and disengage the first brake B1, a hydraulic servo 76 that can engage and disengage the second brake B2 through the inner chamber, and a hydraulic servo 77 that can engage and disengage the second brake B2 through the outer chamber, based on respective engagement pressures regulated and supplied by the various valves described above.

Next, portions generating the various source pressures in the hydraulic control device 100, that is, a line pressure and a modulator pressure, will be described. The portions generating the line pressure and the modulator pressure are similar to those of general hydraulic control devices of automatic transmissions, and are well known, and thus, will be briefly described.

The oil pump 52 is rotationally and drivingly coupled to, for example, the pump impeller 123 of the torque converter 120, and is driven in conjunction with rotation of the engine so as to generate a hydraulic pressure in a manner suctioning the oil from the oil pan (not shown) through the strainer 51. The hydraulic control device 100 includes the linear solenoid valve SLT. The linear solenoid valve SLT uses a modulator pressure Pmod regulated by the solenoid modulator valve 54 as a source pressure to regulate and output a signal pressure PSLT corresponding to a throttle opening amount.

The primary regulator valve 53 regulates the hydraulic pressure generated by the oil pump 52 to a line pressure PL in a manner partially discharging the hydraulic pressure based on the signal pressure PSLT of the linear solenoid valve SLT supplied to the spool of the primary regulator valve 53, the spool being loaded with an urging force of a spring. The line pressure PL is supplied to the solenoid modulator valve 54, the circulation modulator valve 56, the lock-up relay valve 57, the second B2 apply control valve 63, the signal pressure switching valve 64, and the linear solenoid valves SL1 to SL5 and SLU.

The solenoid modulator valve 54 regulates, based on an urging force of a spring thereof, the line pressure PL regulated by the primary regulator valve 53 to the generally constant modulator pressure Pmod when the line pressure PL is a predetermined pressure or higher. The modulator pressure Pmod is supplied as a source pressure to the linear solenoid valve SLT, the solenoid valve SL, the solenoid valve SR, and the linear solenoid valves SC1 to SC3.

Next, a hydraulic control unit (hydraulic control device) 101 serving as a partial circuit of the hydraulic control device 100 of the automatic transmission 1, according to the present embodiment, will be described.

Figure 5:
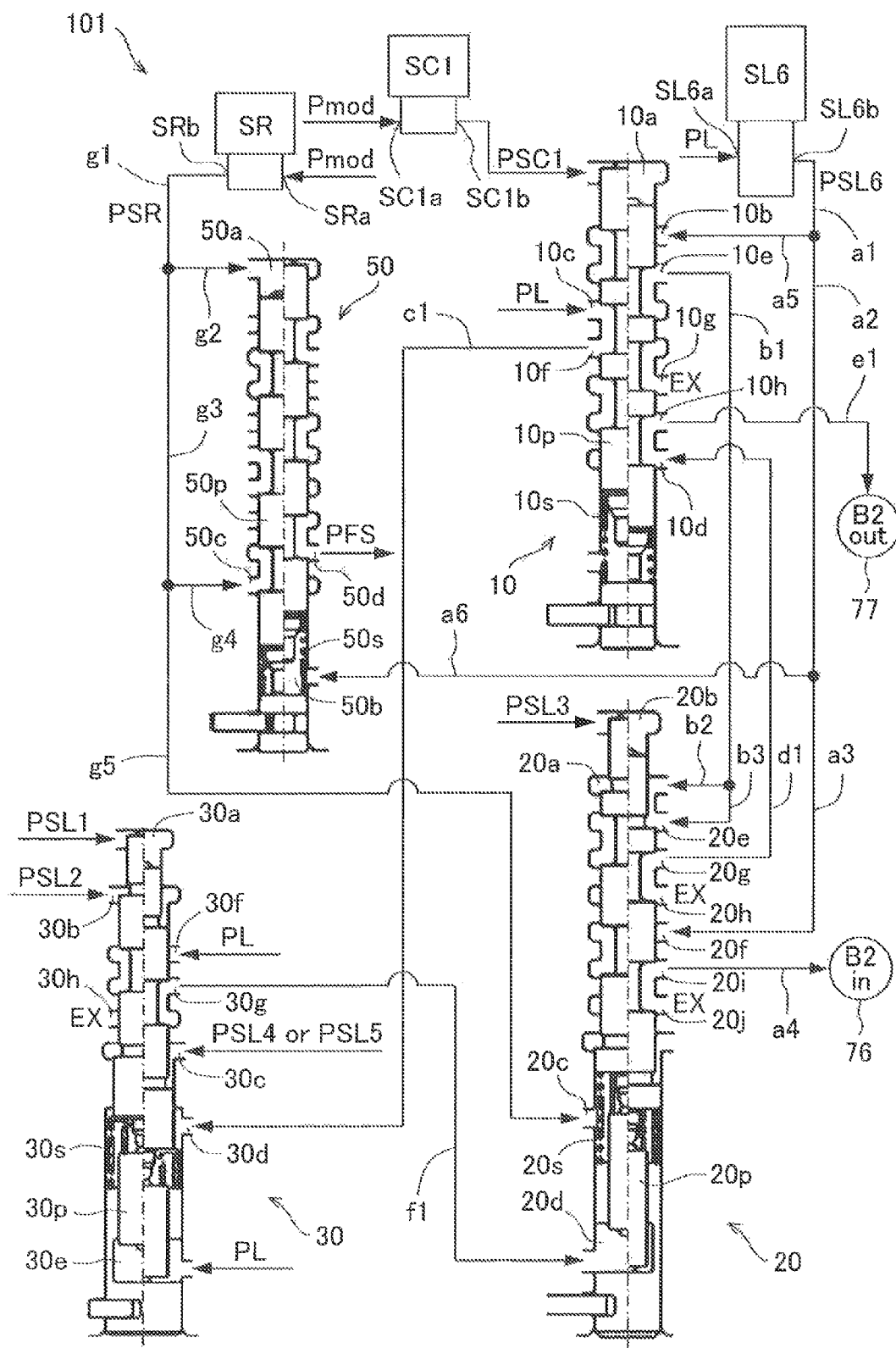
FIG. 5 is a schematic diagram of the hydraulic control device according to the first embodiment.

As shown in FIG. 5, the hydraulic control unit 101 includes, for example, a lubrication relay valve, a circulation modulator valve, a lock-up relay valve, and a sequence valve (all not shown), each of which the spool position is switched or controlled for selectively switching the hydraulic pressures based on the various source pressures to respective oil passages thereof or regulating the hydraulic pressures. The hydraulic control unit 101 also includes a range pressure supply portion (refer to reference numeral 7 in FIG. 6) that selectively supplies a forward range pressure and a reverse range pressure according to the travel range. The hydraulic circuit structure for generating, for example, the line pressure PL and the modulator pressure Pmod is similar to that of general hydraulic control devices of automatic transmissions, so that detailed description thereof will not be given.

The first B2 apply control valve 62 shown in FIG. 4 corresponds to a switching valve 10 in FIG. 5. The second B2 apply control valve 63 shown in FIG. 4 corresponds to a cut-off valve 20 in FIG. 5. The signal pressure switching valve 64 shown in FIG. 4 corresponds to a relay valve 30 in FIG. 5.

First, the significance of the hydraulic control unit 101 of the present embodiment will be described in detail. The hydraulic control unit 101 is a circuit for avoiding what is called a tie-up in which engagement elements that should not normally be simultaneously engaged are engaged in the automatic transmission.

Basically, when a failure where the engagement elements that should not normally be simultaneously engaged are engaged occurs in the automatic transmission 1 of the present embodiment (in other words, when a failure where a linear solenoid corresponding to an engagement element that is not a target of an engagement command outputs a hydraulic pressure occurs, or when a failure where a linear solenoid corresponding to an engagement element that is a target of a disengagement command outputs a hydraulic pressure during shifting occurs), the automatic transmission 1 detects that the failure has occurred in the linear solenoid, and changes to a shift speed at which the engagement element corresponding to the failed linear solenoid is engaged. If the shifting is difficult due to, for example, the vehicle speed, the automatic transmission 1 turns the electric power OFF to shift to the neutral range. In other words, the failure is handled by control.

The failure of the linear solenoid is detected by detecting a current value of the linear solenoid with a sensor, and determining whether the current value is an abnormal value. When the engagement elements that should not normally be simultaneously engaged are engaged, the rotational speed difference between the input shaft and the output shaft deviates from the gear ratio of an intended (currently established) shift speed. Accordingly, the automatic transmission 1 may detect the deviation between the rotational speed difference and the gear ratio (which is what is called gear error detection).

However, the measure by control described above is processing after the failure is detected. Hence, until the failure is handled by software (for example, for 200 ms), a weak tie-up state occurs in which four engagement elements are simultaneously engaged (more precisely, a state in which three engagement elements are engaged, and one engagement element slips).

Then, large deceleration may be generated in some cases in the weak tie-up state. In recent years, due to enhancement in awareness of safety, such temporary deceleration is required to be reduced, and the requirement is satisfied.

In the present embodiment, it is assumed that the engagement failure of the four engagement elements occurs in a situation in which the vehicle is running at a lower shift speed where the second brake B2 is engaged, and in the case where the combination of the four engagement elements is any one of the six combinations listed below, depending on the condition such as the vehicle running speed, deceleration of the vehicle equipped with the automatic transmission 1 may exceed a predetermined value (such as 0.10 G) due to the torque capacity of each of the engagement elements:

1. First clutch C1, second clutch C2, third clutch C3, and second brake B2;
2. First clutch C1, second clutch C2, fourth clutch C4, and second brake B2;

3. First clutch C1, second clutch C2, first brake B1, and second brake B2;
4. First clutch C1, third clutch C3, first brake B1, and second brake B2;
5. Second clutch C2, third clutch C3, first brake B1, and second brake B2;
6. Third clutch C3, fourth clutch C4, first brake B1, and second brake B2.

In view of this, the present embodiment is structured to cut off the supply of the hydraulic pressure to the second brake B2 when, due to failure, the engagement state is changed from that at the shift speed before the failure to any one of the six combinations described above, during shifting or steady running.

In the case of other combinations, due to the torque share or the torque capacity, the slip of engagement elements generates only small deceleration. A specific factor of this is as follows: at least at forward shift speeds, such as a higher forward shift speed, other than the lower (1st to 3rd) forward shift speeds, the hydraulic pressure is not supplied to the outer chamber 77 of the second brake B2 that has a large torque share, and consequently a large torque capacity.

Next, the structure of the hydraulic control unit 101 described above will be explained in detail. The hydraulic control unit 101 includes the linear solenoid valve SL6, the first signal solenoid valve SC1, the switching valve 10, the cut-off valve (first cut valve) 20, the relay valve (second cut valve) 30, the second solenoid valve SR, and a fail-safe valve 50.

The linear solenoid valve SL6 is controlled by the ECU, and has an input port SL6a for receiving the line pressure PL and an output port SL6b capable of outputting a first engagement pressure PSL6. The linear solenoid valve SL6 can regulate the first engagement pressure PSL6 to a pressure equal to the line pressure PL and supply the first engagement pressure PSL6 to the inner chamber 76 of the second brake B2.

The hydraulic control unit 101 includes the linear solenoid valve SL1 for supplying an engagement pressure PSL1 to engage the first clutch C1, the linear solenoid valve SL2 for supplying an engagement pressure PSL2 to engage the second clutch C2, the linear solenoid valve SL3 for supplying a second engagement pressure PSL3 to engage the third clutch C3, the linear solenoid valve SL4 for supplying an engagement pressure PSL4 to engage the fourth clutch C4, and the linear solenoid valve SL5 for supplying an engagement pressure PSL5 to engage the first brake B1, which are capable of supplying hydraulic pressures to the hydraulic servos of the respective engagement elements. For each of the linear solenoid valves SL1 to SL6, the normally closed (N/C) type valve is employed which cuts off communication between the input port and the output port when electricity is not conducted (hereinafter, also called the OFF state) and communicates the input and the output ports when electricity is conducted (hereinafter, also called the ON state).

The first signal solenoid valve SC1 is controlled by the ECU, and has an input port (not shown) for receiving the modulator pressure Pmod and an output port SC1a capable of outputting a first signal pressure (signal pressure) PSC1 that is generated based on the modulator pressure Pmod. The first signal solenoid valve SC1 uses the first signal pressure PSC1 output therefrom so as to be capable of controlling the switching valve 10.

The switching valve 10 includes a first oil chamber 10a supplied with the first signal pressure PSC1, a first input port 10b for receiving the first engagement pressure PSL6 through oil passages a1 and a5, a second input port 10c for receiving the line pressure PL, a third input port 10d connected to a first output port 20g (to be described later) of the cut-off valve 20 through an oil passage d1, a first output port 10e connected to a first oil chamber 20a and a first input port 20e (to be described later) of the cut-off valve 20 through oil passages b1, b2, and b3, a second output port 10f connected to a fourth oil chamber 30d (to be described later) of the relay valve 30 through an oil passage c1, a drain port 10g, and a third output port 10h connected to the outer chamber 77 through an oil passage e1.

The switching valve 10 also includes a spool 10p and a spring 10s. The spool 10p can switch between a cut-off position (second state) (left-half position in the figure) of communicating the first input port 10b with the first output port 10e, communicating the second input port 10c with the second output port 10f, communicating the third output port 10h with the drain port 10g, and cutting off the supply of the hydraulic pressure to the third input port 10d, and a communication position (first state) (right-half position in the figure) of cutting off the supply of the hydraulic pressure to the first input port 10b, communicating the second input port 10c with the first output port 10e, communicating the second output port 10f with the drain port 10g, and communicating the third input port 10d with the third output port 10h. The spring 10s is formed of a compression coil spring for urging the spool 10p toward the cut-off position. With this structure, when the switching valve 10 is not supplied with the first signal pressure PSC1 from the first signal solenoid valve SC1, the spool 10p is positioned in the cut-off position to cut off communication between the second input port 10c and the first output port 10e, so that the supply of the line pressure PL to the outer chamber 77 is restricted, and when the switching valve 10 is supplied with the first signal pressure PSC1 from the first signal solenoid valve SC1, the spool 10p is positioned in the communication position to communicate the second input port 10c with the first output port 10e, so that the line pressure PL can be supplied as a third engagement pressure to the outer chamber 77 (hereinafter, the third engagement pressure is the same as the line pressure PL). The first signal solenoid valve SC1 and the switching valve 10 constitute a first hydraulic pressure supply portion.

As can be understood from FIG. 2, the switching valve 10 is placed in the cut-off position (second state) described above when at least the forward shift speeds, such as a higher forward shift speed, other than the lower (1st to 3rd) forward shift speeds, are established, and placed in the communication position (first state) described above when the lower forward shift speeds and the reverse speed are established. Specifically, the hydraulic pressure is supplied to only the inner chamber at the fourth speed, and is supplied to neither the inner chamber nor the outer chamber at the fifth to the tenth speeds.

The cut-off valve 20 includes the first oil chamber 20a supplied with the hydraulic pressure generated when the second brake B2 is engaged, a second oil chamber 20b supplied with the third engagement pressure PSL3 of the third clutch C3 that is not engaged simultaneously with the second brake B2 when a forward range is selected, and third and fourth oil chambers 20c and 20d that are supplied with hydraulic pressures to generate forces against pressing forces from the first and the second oil chambers 20a and 20b. When the spool 10p of the switching valve 10 is in the communication position, the line pressure PL is supplied to the first oil chamber 20a through the oil passages b1 and b2, as the hydraulic pressure generated when the second brake B2 is engaged. When the spool 10p of the switching valve 10 is in the cut-off position, the first engagement pressure PSL6 is supplied to the first oil chamber 20a through the oil passages b1 and b2, as the hydraulic pressure generated when the second brake B2 is engaged. The third oil chamber 20c can be supplied with a second signal pressure (third counter pressure) PSR from the second solenoid valve SR through oil passages g1, g3, and g5. The fourth oil chamber 20d can be supplied with the line pressure (first counter pressure) PL from an output port 30g (to be described later) of the relay valve 30 through an oil passage f1.

The cut-off valve 20 includes the first input port 20e connected to the first output port 10e of the switching valve 10 through the oil passages b3 and b1, a second input port 20f connected to the linear solenoid valve SL6 through the oil passages a1, a2, and a3, the first output port 20g connected to the third input port 10d of the switching valve 10 through the oil passage d1, a second output port 20i connected to the inner chamber 76 through an oil passage a4, a drain port 20h, and a drain port 20j.

The cut-off valve 20 also includes a spool 20p and a spring 20s. The spool 20p can switch between a communication position (third state) (left-half position in the figure) of communicating the first input port 20e with the first output port 20g and communicating the second input port 20f with the second output port 20i, and a cut-off position (fourth state) (right-half position in the figure) of communicating the first input port 20e with the first oil chamber 20a, communicating the first output port 20g with the drain port 20h, communicating the second output port 20i with the drain port 20j, and cutting off the supply of the hydraulic pressure to the second input port 20f. The spring 20s is formed of a compression coil spring for urging the spool 20p toward the communication position.

The spool 20p of the cut-off valve 20 has land portions with different diameters, and has a pressure receiving area facing the second oil chamber 20b set equal to that facing the fourth oil chamber 20d, and also has a pressure receiving area facing the first oil chamber 20a set smaller than that facing the third oil chamber 20c. As a result, for example, when both the first oil chamber 20a and the second oil chamber 20b are supplied with hydraulic pressures, the spool 20p is locked in the communication position only when both the third oil chamber 20c and the fourth oil chamber 20d are supplied with hydraulic pressures, but is switched to the cut-off position when one of the third oil chamber 20c and the fourth oil chamber 20d is not supplied with the hydraulic pressure. When at least one of the third oil chamber 20c and the fourth oil chamber 20d is supplied with the hydraulic pressure, the spool 20p is positioned in the communication position even if only one of the first oil chamber 20a and the second oil chamber 20b is supplied with the hydraulic pressure. The oil passages a1, a2, a3, and a4 serve as a first oil passage. The oil passages b1, b3, d1, and e1 serve as a second oil passage.

The relay valve 30 includes a first oil chamber 30a supplied with the engagement pressure PSL1, a second oil chamber 30b supplied with the engagement pressure PSL2, a third oil chamber 30c supplied with higher one of the engagement pressure PSL4 and the engagement pressure PSL5, the fourth oil chamber 30d connected to the second output port 10f of the switching valve 10 through the oil passage c1, and a fifth oil chamber 30e supplied with the line pressure PL. The relay valve 30 also includes an input port 30f supplied with the line pressure PL, the output port 30g connected to the fourth oil chamber 20d of the cut-off valve 20 through the oil passage f1, and a drain port 30h. The fourth oil chamber 30d can be supplied with a second counter pressure PL through the oil passage c1.

The relay valve 30 includes a spool 30p and a spring 30s. The spool 30p can switch between a normal position (left-half position in the figure) of communicating the input port 30f with the output port 30g and a cut-off position (right-half position in the figure) of cutting off the supply of the hydraulic pressure to the input port 30f and draining the hydraulic pressure from the output port 30g. The spring 30s is formed of a compression coil spring for urging the spool 20p toward the normal position. In this structure, the spool 30p of the relay valve 30 has land portions with different diameters; the total area of the pressure receiving area facing the first oil chamber 30a and the pressure receiving area facing the second oil chamber 30b is set equal to the pressure receiving area facing the fifth oil chamber 30e; and the pressure receiving area facing the third oil chamber 30c is set equal to the pressure receiving area facing the fourth oil chamber 30d. As a result, for example, when the fourth oil chamber 30d is not supplied with the hydraulic pressure, the spool 30p is switched to the cut-off position when the relay valve 30 is supplied with three hydraulic pressures consisting of the engagement pressure PSL1, the engagement pressure PSL2, and one of the engagement pressures PSL4 and PSL5. The spool 30p is locked in the normal position when the fourth oil chamber 30d is supplied with the hydraulic pressure.

The second solenoid valve SR is controlled by the ECU, and has an input port SRa for receiving the modulator pressure Pmod and an output port SRb capable of outputting the second signal pressure PSR that is generated based on the modulator pressure Pmod. The second solenoid valve SR uses the second signal pressure PSR output therefrom so as to be capable of controlling the fail-safe valve 50.

The fail-safe valve 50 includes a first oil chamber 50a supplied with the second signal pressure PSR from the second solenoid valve SR through oil passages g1 and g2, and also includes a second oil chamber 50b that is connected to the linear solenoid valve SL6 through oil passages a1, a2, and a6 and is supplied with the first engagement pressure PSL6. The fail-safe valve 50 has an input port 50c connected to the output port SRb of the second solenoid valve SR through oil passages g1, g3, and g4, and also has an output port 50d capable of outputting a fail-safe signal pressure PFS. The oil passages g1, g2, g3, and g4 for connecting the fail-safe valve 50 to the second solenoid valve SR serve as a fail-safe circuit. The fail-safe circuit is connected to the third oil chamber 20c of the cut-off valve 20 through the oil passage g5.

The fail-safe valve 50 includes a spool 50p and a spring 50s. The spool 50p can switch between a normal position (right-half position in the figure) of cutting off the supply of the hydraulic pressure to the input port 50c and a failure position (left-half position in the figure) of communicating the input port 50c with the output port 50d. The spring 50s is formed of a compression coil spring for urging the spool 50p toward the normal position. With this structure, when the first engagement pressure PSL6 is not supplied, the fail-safe valve 50 does not output the fail-safe signal pressure PFS since the second signal pressure PSR is not supplied, and outputs the second signal pressure PSR as the fail-safe signal pressure PFS since the second signal pressure PSR is supplied. Thus, the fail-safe valve 50 appropriately performs a fail-safe operation. When the first engagement pressure PSL6 is supplied, the spool 50p of the fail-safe valve 50 is locked in the normal position, so that the fail-safe signal pressure PFS is not output even if the second signal pressure PSR is supplied. The second solenoid valve SR and the fail-safe valve 50 constitute a second hydraulic pressure supply portion.

Next, operations of the hydraulic control unit 101 of the automatic transmission 1 according to the present embodiment will be described in detail.

When any of the first to the third forward speeds in the forward range is selected, hydraulic pressures are supplied to both the inner chamber 76 and the outer chamber 77 of the second brake B2 (refer to FIG. 2). In this case, a control signal from the ECU turns ON the linear solenoid valve SL6 and two of the linear solenoid valves except the linear solenoid valve SL3, and the first signal solenoid valve SC1 outputs the first signal pressure PSC1. Through the operation, the spool 10p of the switching valve 10 is placed in the communication position thereof, and the spool 20p of the cut-off valve 20 is placed in the communication position thereof.

The first engagement pressure PSL6 from the linear solenoid valve SL6 is supplied to the cut-off valve 20 through the oil passages a1, a2, and a3, and supplied to the inner chamber 76 through the oil passage a4. The line pressure PL received through the second input port 10c of the switching valve 10 is supplied to the cut-off valve 20 through the oil passages b1, b2, and b3, then is supplied to the switching valve 10 through the oil passage d1, and is supplied as the third engagement pressure to the outer chamber 77 through the oil passage e1. As a result, the second brake B2 receives engagement pressures from both of the two chambers 76 and 77, and is engaged. The spool 30p of the relay valve 30 is in the normal position, so that the line pressure PL is supplied to the fourth oil chamber 20d of the cut-off valve 20 through the oil passage f1. As a result, the spool 20p is locked in the communication position even if the line pressure PL is supplied to the first oil chamber 20a of the cut-off valve 20.

If an ON failure occurs, for example, in the linear solenoid valve SL3 that generates the third engagement pressure PSL3 of the third clutch C3, the third engagement pressure PSL3 is supplied to the second oil chamber 20b of the cut-off valve 20. Through the operation, hydraulic pressures are simultaneously supplied to the first and the second oil chambers 20a and 20b, so that the spool 20p is switched to the cut-off position by overcoming a pressing force caused by the line pressure PL supplied to the fourth oil chamber 20d. Therefore, communication between the oil passages a3 and a4 is cut off to cut off the supply of the first engagement pressure PSL6 to the inner chamber 76, and also communication between the oil passages b3 and d1 is cut off to cut off the supply of the line pressure PL to the outer chamber 77. Consequently, the second brake B2 is disengaged, and hence, it is possible to avoid simultaneous engagement with the third clutch C3 when the forward range is selected.

For example, when the vehicle is running at the first forward speed, if electrical failures or the like cause the linear solenoid valve SL3 to output the hydraulic pressure and to engage the third clutch C3, the four engagement elements consisting of the first, the second, and the third clutches C1, C2, and C3, and the second brake B2 are simultaneously engaged, resulting in a combination that can cause deceleration exceeding the predetermined value. Hence, to avoid such a simultaneous engagement, the supply of the hydraulic pressure to the second brake B2 is cut off.

In this case, the linear solenoid valves SL1, SL2, and SL6 and the solenoid valve SC1 operate at the first forward speed. When the ON failure (failure of outputting the hydraulic pressure) occurs in the linear solenoid valve SL3, the engagement pressure PSL3 is supplied to the second oil chamber 20b of the cut-off valve 20, in which a difference in area between a small-diameter land portion and a medium-diameter land portion causes a downward urging force to be generated, so that the spool 20p is switched to the cut-off position against a locking pressure (line pressure supplied to the oil chamber 20d) and the spring 20s. Accordingly, communication between the second input port 20f and the second output port 20i is cut off, so that the engagement pressure PSL6 received through the second input port 20f is not supplied to the hydraulic servo 76, and thus, the second brake B2 is disengaged. As a result, even if electrical failures or the like cause the linear solenoid valve SL3 to output the hydraulic pressure, the four engagement elements consisting of the first, the second, and the third clutches C1, C2, and C3, and the second brake B2 are not simultaneously engaged. Accordingly, the deceleration is suppressed so as not to exceed the predetermined value. Then, appropriate processing is performed, such as performing control to select another shift speed.

When the fourth forward speed in the forward range is selected, the second brake B2 is engaged using only the inner chamber 76 (refer to FIG. 2). In this case, the control signal from the ECU turns ON the linear solenoid valves SL4 and SL5 in addition to the linear solenoid valve SL6, and the first signal solenoid valve SC1 does not output the first signal pressure PSC1. Through the operation, the spool 10p of the switching valve 10 is placed in the cut-off position, and the spool 20p of the cut-off valve 20 is placed in the communication position thereof.

The first engagement pressure PSL6 from the linear solenoid valve SL6 is supplied to the inner chamber 76 through the oil passages a1, a2, a3, and a4. The line pressure PL received through the second input port 10c of the switching valve 10 is supplied to the fourth oil chamber 30d of the relay valve 30 through the oil passage c1, and locks the spool 30p in the normal position. The outer chamber 77 is connected to the drain port 10g of the switching valve 10 through the oil passage e1, and the hydraulic pressure is drained. As a result, the second brake B2 is engaged by an engagement pressure of the inner chamber 76 only.

When a reverse range is selected, the hydraulic pressures are supplied to both the inner chamber 76 and the outer chamber 77 of the second brake B2 (refer to FIG. 2). In this case, the control signal from the ECU turns ON the linear solenoid valves SL2 and SL3 in addition to the linear solenoid valve SL6, and the first signal solenoid valve SC1 outputs the first signal pressure PSC1. Through the operation, the spool 10p of the switching valve 10 is placed in the communication position thereof, and the spool 20p of the cut-off valve 20 is placed in the communication position thereof.

The first engagement pressure PSL6 from the linear solenoid valve SL6 is supplied to the cut-off valve 20 through the oil passages a1, a2, and a3, and supplied to the inner chamber 76 through the oil passage a4. At the same time, the first engagement pressure PSL6 is also supplied to the second oil chamber 50b of the fail-safe valve 50 through the oil passage a6, and the spool 50p is locked in the normal position.

When the reverse range is selected, the second signal pressure PSR is output from the second solenoid valve SR, and supplied to the third oil chamber 20c of the cut-off valve 20 through the oil passages g1, g3, and g5. The spool 30p of the relay valve 30 is in the normal position, so that the line pressure PL is supplied to the fourth oil chamber 20d of the cut-off valve 20 through the oil passage f1. As a result, the spool 20p remains in a locked state in the communication position even if both the first and the second oil chambers 20a and 20b of the cut-off valve 20 are supplied with hydraulic pressures to engage both the third clutch C3 and the second brake B2 when the reverse range is selected. Thus, the second brake B2 can be prevented from being disengaged.

In the fail-safe valve 50, the first engagement pressure PSL6 keeps locking the spool 50p in the normal position, so that the fail-safe valve 50 is prevented from malfunctioning by switching of the spool 50p to the failure position when the second signal pressure PSR is output.

When N range or P range is selected, the hydraulic pressures are supplied to both the inner chamber 76 and the outer chamber 77 of the second brake B2 (refer to FIG. 2). In N range and P range, the forward range pressure and the reverse range pressure are not generated. However, while the engine is driven, the line pressure PL and the modulator pressure Pmod are constantly generated, so that the linear solenoid valves (such as SL6), the first signal solenoid valve SC1, and the second signal solenoid valve SR that use the line pressure PL as a source pressure are allowed to operate in the same manner as described above. In this case, the control signal from the ECU turns ON the linear solenoid valves SL6 and SL2, and the first signal solenoid valve SC1 outputs the first signal pressure PSC1. Through the operation, the spool 10p of the switching valve 10 is placed in the communication position thereof, and the spool 20p of the cut-off valve 20 is placed in the communication position thereof.

The first engagement pressure PSL6 from the linear solenoid valve SL6 is supplied to the cut-off valve 20 through the oil passages a1, a2, and a3, and supplied to the inner chamber 76 through the oil passage a4. The line pressure PL received through the second input port 10c of the switching valve 10 is supplied to the cut-off valve 20 through the oil passages b1, b2, and b3, then is supplied to the switching valve 10 through the oil passage d1, and is supplied as the third engagement pressure to the outer chamber 77 through the oil passage e1. As a result, the second brake B2 receives engagement pressures from both of the two chambers 76 and 77, and is engaged.

Next, when switching the range from the forward range (any of the first to the third forward speeds) to the reverse range, the hydraulic pressures are supplied to both the inner chamber 76 and the outer chamber 77 of the second brake B2 (refer to FIG. 2). When switching the range from the forward range to the reverse range, the forward range pressure generated in the forward range is reduced to zero, and the reverse range pressure is generated in the reverse range entered immediately after reducing the forward range to zero, so that the range pressure is interrupted for a moment. On the contrary, while the engine is driven, the line pressure PL and the modulator pressure Pmod are constantly generated, so that the linear solenoid valves, the first signal solenoid valve SC1, and the second signal solenoid valve SR that use the line pressure PL as a source pressure are allowed to operate in the same manner as described above, even when the range is switched from the forward range to the reverse range. As a result, the second brake B2 is engaged by receiving the engagement pressures from both of the two chambers 76 and 77 while engagement elements to be engaged other than the second brake B2 are appropriately changed. The same as described above also applies to a case where the reverse range is switched to the forward range (any of the first to the third forward speeds).

As described above, according to the hydraulic control unit 101 of the present embodiment, the first engagement pressure PSL6 generated from the line pressure PL is supplied from the linear solenoid valve SL6 to the inner chamber 76, and the line pressure PL is supplied from the switching valve 10 to the outer chamber 77. Consequently, the first engagement pressure PSL6 and the line pressure PL can be constantly supplied as long as the line pressure PL is generated, and both the first engagement pressure PSL6 and the line pressure PL are generated regardless of the range pressure and even when N range is selected. This configuration can stably maintain the engagement pressures of both the inner chamber 76 and the outer chamber 77 even if the hydraulic pressure is interrupted for a moment when the range is switched between the forward range and the reverse range, or even if the range pressure is not generated when N range is selected.

The hydraulic control unit 101 of the present embodiment includes the cut-off valve 20, which includes the first hydraulic oil chamber 20a supplied with the hydraulic pressure PSL6 or PL generated when the second brake B2 is engaged and the second hydraulic oil chamber 20b supplied with the third engagement pressure PSL3 of the third clutch C3 that is not engaged simultaneously with the second brake B2 when the forward range is selected. The cut-off valve 20 is interposed in the first oil passage for connecting the linear solenoid valve SL6 to the inner chamber 76, and also interposed in the second oil passage for connecting the switching valve 10 to the outer chamber 77. The cut-off valve 20 can switch between the communication position in which each of the first and the second oil passages is in the communicating state and the cut-off position in which each of the first and the second oil passages is in the cut-off state, and is switched from the communication position to the cut-off position when the hydraulic pressure PSL6 or PL is supplied to the first hydraulic oil chamber 20a and the second hydraulic oil chamber 20b when the forward range is selected.

As a result, the cut-off valve 20 can simultaneously switch the first and the second oil passages between the communicating state and the cut-off state. Specifically, the cut-off valve 20 can simultaneously switch the oil passages a3 and a4 for supplying the first engagement pressure PSL6 to the inner chamber 76 and the oil passages b3 and d1 for supplying the line pressure PL to the outer chamber 77 between the communicating state and the cut-off state. As a result, simply operating one valve can control the supply and discharge of the engagement pressures to and from the two chambers 76 and 77.

In the hydraulic control unit 101 of the present embodiment, as the hydraulic pressure PSL6 or PL generated when the second brake B2 is engaged, the switching valve 10 supplies the line pressure PL to the first hydraulic oil chamber 20a of the cut-off valve 20 when the switching valve 10 is in the communication position, and supplies the first engagement pressure PSL6 to the first hydraulic oil chamber 20a of the cut-off valve 20 when the switching valve 10 is in the cut-off position.

Accordingly, in order to avoid the simultaneous engagement of the second brake B2 and the third clutch C3 in the forward range, the cut-off valve 20 disengages the second brake B2 during simultaneous engagement between the second brake B2 and the third clutch C3. When the outer chamber 77 is supplied with the line pressure PL, the line pressure PL is supplied to the first oil chamber 20a of the cut-off valve 20 as the engagement pressure of the second brake B2, and when the outer chamber 77 is not supplied with the line pressure PL, the first engagement pressure PSL6 is supplied to the first oil chamber 20a of the cut-off valve 20 as the engagement pressure of the second brake B2. Consequently, when the outer chamber 77 is supplied with the line pressure PL, the line pressure PL is supplied to the first oil chamber 20a of the cut-off valve 20, so that establishment of a condition for switching the cut-off valve 20 is ensured by checking the operation of the second brake B2 caused by the outer chamber 77, regardless of whether the first engagement pressure PSL6 is supplied. When the outer chamber 77 is not supplied with the line pressure PL, the first engagement pressure PSL6 is supplied to the first oil chamber 20a of the cut-off valve 20, so that establishment of the condition for switching the cut-off valve 20 is ensured by checking the operation of the second brake B2 caused by the inner chamber 76.

Two types of hydraulic pressures can be supplied to only one port of the first oil chamber 20a, so that the structure of the cut-off valve 20 can be simplified compared to the case where the two types of hydraulic pressures are supplied to respective separate ports. Moreover, it is possible to ensure establishment of two conditions using one port, where one condition is satisfied by the operation of the inner chamber 76 and the other condition is satisfied by the operation of the outer chamber 77. As a result, the valve structure can be simplified compared to the case where a similar function is achieved using separate ports. In addition, although control needs to be performed corresponding to each of the separate ports if the hydraulic pressures are supplied to the separate ports, the control of this structure can be simplified without the need of such separate control.

If the cut-off valve 20 is in the communication position and the switching valve 10 is in the cut-off position, the first engagement pressure PSL6 supplied from the linear solenoid valve SL6 is cut off through the cut-off valve 20 at the switching valve 10. As a hydraulic pressure circuit, the hydraulic pressure stands by immediately before reaching the outer chamber 77. In this state, switching the switching valve 10 to the communication position cuts off the first engagement pressure PSL6, and supplies the line pressure PL to the outer chamber 77 through the cut-off valve 20 and the switching valve 10. As a result, the line pressure PL is supplied to the outer chamber 77 as soon as the switching valve 10 is switched, because the first engagement pressure PSL6 has been standing by in the oil passage d1. Thus, the response can be improved.

The hydraulic control unit 101 of the present embodiment includes the cut-off valve 20, the second signal solenoid valve SR, and the fail-safe valve 50. The cut-off valve 20 includes the third hydraulic oil chamber 20c that is supplied with the hydraulic pressure to generate a force against the pressing forces from the first and the second hydraulic oil chambers 20a and 20b. The second signal solenoid valve SR can supply the second signal pressure PSR to the third hydraulic oil chamber PSR. The fail-safe valve 50 can switch between the normal position of supplying and cutting off the second signal pressure PSR and the failure position of outputting the second signal pressure PSR as the fail-safe signal pressure PFS, and includes a first oil chamber 50a that generates a force to switch from the normal position to the failure position by being supplied with the second signal pressure PSR, and a second oil chamber 50b that enables the fail-safe valve 50 to be locked in the normal position by being supplied with the first engagement pressure PSL6.

This structure allows the cut-off valve 20 to be locked in the communication position using the second signal solenoid valve SR for switching the fail-safe valve 50. As a result, when the second brake B2 and the third clutch C3 need to be simultaneously engaged while the reverse range is selected, the cut-off valve 20 is prevented from being switched to the cut-off position in response to the simultaneous engagement of the second brake B2 and the third clutch C3.

The fail-safe valve 50 is locked in the normal position by being supplied with the first engagement pressure PSL6. Therefore, when the second signal pressure PSR is output from the second signal solenoid valve SR to lock the cut-off valve 20 during the reverse range, the fail-safe valve 50 can be prevented from being switched to the failure position.

In the hydraulic control unit 101 of the present embodiment, the automatic transmission 1 includes the four clutches C1, C2, C3, and C4 and the two brakes B1 and B2 as the engagement elements and is capable of establishing the ten forward speeds and the reverse speed by simultaneously engaging selected three of the engagement elements. The first engagement element B2 is one of the two brakes.

This structure allows the hydraulic control unit 101 to be used in the automatic transmission 1 that includes the four clutches C1, C2, C3, and C4 and the two brakes B1 and B2 and is capable of establishing the ten forward speeds and the reverse speed by simultaneously engaging selected three of the engagement elements.

Figure 6:
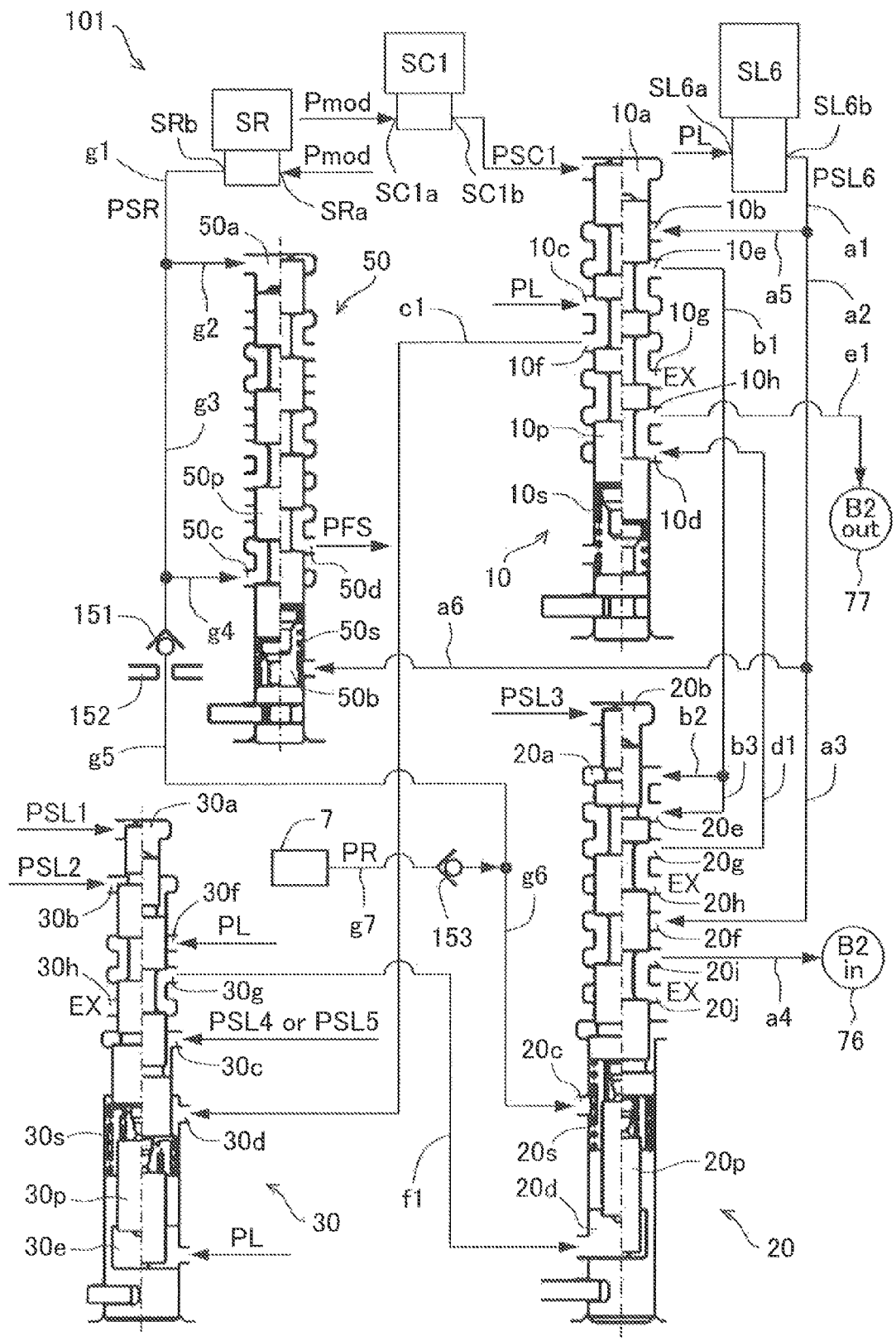
FIG. 6 is a schematic diagram of a modification of the hydraulic control device according to the first embodiment.

In the hydraulic control unit 101 of the present embodiment described above, the fail-safe circuit is connected to the third oil chamber 20c of the cut-off valve 20 only through the oil passage g5 so that the hydraulic pressure is supplied from the second signal solenoid valve SR to the third oil chamber 20c when the reverse range is selected. The present disclosure, however, is not limited thereto. For example, as shown in FIG. 6, a range pressure supply portion 7 may be connected through an oil passage (fourth oil passage) g7 to oil passages (third oil passage) g5 and g6 for connecting the fail-safe circuit to the third oil chamber 20c of the cut-off valve 20, and the hydraulic control unit 101 may include a first check valve 151 provided in the oil passages g5 and g6 for connecting the fail-safe circuit to the third oil chamber 20c of the cut-off valve 20 and a second check valve 153 that is interposed in the oil passage g7 and causes a reverse range pressure PR to pass from the range pressure supply portion 7 to the oil passages g5 and g6 while cutting off a hydraulic pressure in the opposite direction. In this case, the oil passage g7 connected to the range pressure supply portion 7 is connected to the oil passages g5 and g6 extending between the first check valve 151 and the third hydraulic oil chamber 20c. An orifice 152 may be provided on the third oil chamber 20d side of the first check valve 151.

That is, the hydraulic control unit 101 of the present embodiment includes the third oil passages g5 and g6 that connect, the fail-safe circuit connecting the second signal solenoid valve SR and the fail-safe valve 50, and the third hydraulic oil chamber 20c of the cut-off valve 20; the first check valve 151 that is interposed in the third oil passages g5 and g6 and causes the second signal pressure PSR to pass from the second signal solenoid valve SR to the third hydraulic oil chamber 20c of the cut-off valve 20 while cutting off a hydraulic pressure in the opposite direction; the range pressure supply portion 7 for supplying the reverse range pressure PR to the third oil passages g5 and g6 when the travel range is the reverse range; the fourth oil passage g7 for connecting the third oil passages g5 and g6 extending between the first check valve 151 and the third hydraulic oil chamber 20c to the range pressure supply portion 7; and the second check valve 153 that is interposed in the fourth oil passage g7 and causes the reverse range pressure PR to pass from the range pressure supply portion 7 to the third oil passages g5 and g6 while cutting off the hydraulic pressure in the opposite direction. The hydraulic control unit 101 supplies the reverse range pressure (PR) to the third hydraulic oil chamber 20c of the cut-off valve 20 through the fourth oil passage g4 when the reverse range is selected.

Thus, in the hydraulic control unit 101 shown in FIG. 6, the reverse range pressure PR output from the range pressure supply portion 7 is supplied to the third oil chamber 20c of the cut-off valve 20 through the oil passages g7 and g6 when the reverse range is selected. As a result, the reverse range pressure PR can lock the cut-off valve in the communication position when the reverse range is selected.

For example, when the reverse range is selected, depressing the accelerator pedal by a large amount increases the first engagement pressure PSL6, the third engagement pressure PL, and the second engagement pressure PSL3, so that the second signal pressure PSR from the second signal solenoid valve SR may be insufficient for a locking force to lock the cut-off valve 20. In contrast, the hydraulic control unit 101 of the present embodiment can obtain a locking force corresponding to the increase in the engagement pressure by supplying the reverse range pressure PR to the cut-off valve 20 when the reverse range is selected.

The first check valve 151 is provided, so that the reverse range pressure PR can be prevented from causing the fail-safe valve 50 to malfunction. In addition, the second check valve 153 is provided, so that the hydraulic pressure can be prevented from being drained from the range pressure supply portion 7 in the case in which the second signal pressure PSR is supplied from the second signal solenoid valve SR to the cut-off valve 20 when the reverse range pressure PR is not generated, such as when N range is selected, or at the time when the range is switched from the forward range to the reverse range.

As described above, according to the hydraulic control unit 101 of the present embodiment, when PSL3 and PSL6 are output, the cut-off valve 20 cuts off the supply of the hydraulic pressure to the second brake B2 so as to be capable of suppressing the simultaneous engagement of the second brake B2 to be engaged at lower shift speeds and the third clutch C3 to be engaged at higher shift speeds. Therefore, the state in which the deceleration exceeds the predetermined value to be large can be avoided due to the simultaneous engagement of the second brake B2 and the third clutch C3. Furthermore, a pattern in which the deceleration increases due to characteristics (such as a torque share and a torque capacity) of a gear train is identified, and it is found that, by cutting off the supply of the hydraulic pressure only to the second brake B2, the hydraulic control unit 101 is capable of adapting to the pattern causing large deceleration, and the cut-off valve is provided only in the oil passage for supplying the hydraulic pressure to the second brake B2. Therefore, the hydraulic control unit 101 can be configured to be small in size compared to the case in which a plurality of cut-off valves is provided to cut off the supply of the hydraulic pressures to a plurality of engagement elements. As a result, even if the number of engagement elements increases as in the case of the automatic transmission 1 that can establish the ten forward speeds, for example, the valves can be provided without causing an increase in the number of components thereof or an increase in the size thereof.

According to the hydraulic control unit 101 of the present embodiment, the second brake B2 is an engagement element commonly used at the first forward speed and the reverse speed in which the input torque is large, so that by cutting off the supply of the hydraulic pressure to the second brake B2 having a large torque capacity, the generation of the deceleration can be effectively suppressed.

According to the hydraulic control unit 101 of the present embodiment, when the first forward speed or the reverse speed is established, only the second brake B2 is a brake, and all other engagement elements, that is, the first, the second, and the third clutches C1, C2, and C3 are clutches. The second brake B2 serves as a reaction force element at the first forward speed and the reverse speed where the torque capacity to input is large, so that the torque capacity of the second brake B2 is large. Hence, the hydraulic control unit 101 can effectively suppress the generation of the deceleration by cutting off the supply of the hydraulic pressure to the second brake B2 in which the torque capacity is large.

According to the hydraulic control unit 101 of the present embodiment, the second brake B2 is an engagement element that includes an engagement oil chamber having a double-chamber structure including the first engagement oil chamber 76 which the first engagement pressure PSL6 is supplied to and discharged from and the second engagement oil chamber 77 which the third engagement pressure PL is supplied to and discharged from. The second brake B2 is engageable and disengageable when at least one of the first engagement pressure PSL6 and the third engagement pressure PL is supplied and discharged. The hydraulic control unit 101 includes the first signal solenoid valve SC1 that can supply the first signal pressure PSC1 and the switching valve 10 that is capable of switching by the first signal pressure PSC1 between the first state in which the line pressure PL is supplied as the third engagement pressure to the second engagement oil chamber 77 and the second state in which the supply of the line pressure PL to the second engagement oil chamber 77 is cut off. The hydraulic control unit 101 is structured so as to place the switching valve 10 in the second state when establishing at least the forward shift speeds, such as a higher forward shift speed, other than the lower (1st to 3rd) forward shift speeds.

For this purpose, the hydraulic control unit 101 is structured to cut off the supply of the hydraulic pressure to one of the hydraulic oil chambers at least at a higher forward shift speed. Hence, if the linear solenoid valve SL6 fails in outputting the hydraulic pressure while the vehicle is running at the higher forward shift speed, the torque capacity of the second brake B2 is small compared to the case in which the hydraulic pressure is supplied to the second engagement oil chamber 77, so that smaller deceleration is generated. Accordingly, by employing the present structure in conjunction with a structure that switches the hydraulic pressure supply to cut off the supply of the hydraulic pressure to the second brake B2 when the above-described cut-off valve 20 is simultaneously supplied with the first engagement pressure PSL6 to the second brake B2 and the second engagement pressure PSL3 to the third clutch C3, the generation of the deceleration at the predetermined value or higher can be suppressed at lower shift speeds and higher shift speeds, with a small number of valves.

The hydraulic control unit 101 of the automatic transmission 1 according to the present embodiment can supply the first counter pressure PL against one of the first and the second engagement pressures PSL6 and PSL3 to the cut-off valve 20. Consequently, when the first counter pressure PL is supplied, supplying both the first and the second engagement pressures PSL6 and PSL3 moves the spool 20p of the cut-off valve 20 to the right-half position, but supplying only one of the first and the second engagement pressures PSL6 and PSL3 cannot move the spool 20p to the right-half position. As a result, the second brake B2 can be engaged by supplying the first counter pressure PL.

The hydraulic control unit 101 of the automatic transmission 1 according to the present embodiment includes the relay valve 30 that can cut off the supply of the first counter pressure PL to the cut-off valve 20 when engagement pressures are simultaneously supplied to three engagement elements other than the second brake B2 and the third clutch C3. As a result, if the first engagement pressure PSL6 is supplied when the engagement pressures are simultaneously supplied to three engagement elements other than the second brake B2 and the third clutch C3, the spool 20p of the cut-off valve 20 moves to the right-half position, and the first engagement pressure PSL6 is cut off. Thus, the tie-up can be prevented.

The hydraulic control unit 101 of the automatic transmission 1 according to the present embodiment includes the switching valve 10 that can supply, when a shift speed is established by simultaneously engaging four engagement elements consisting of the third clutch C3 and three other engagement elements, the relay valve 30 with the second counter pressure PL against the engagement pressures applied to the three engagement elements. As a result, the shift speed, such as the seventh forward speed, can be established by simultaneously engaging the four clutches.

In the hydraulic control unit 101 of the automatic transmission 1 according to the present embodiment, the second brake B2 and the third clutch C3 are simultaneously engaged when establishing the reverse speed, and includes the fail-safe valve 50 that can supply the third counter pressure PSR against the first and the second engagement pressures PSL6 and PSL3 to the cut-off valve 20 when the reverse speed is established. As a result, the second brake B2 and the third clutch C3 can be simultaneously engaged when the reverse speed is established.

While PSR serves as the third counter pressure in the present embodiment, the present disclosure is not limited thereto. The reverse range pressure PR may be, for example, used as the third counter pressure.

In the hydraulic control unit 101 of the automatic transmission 1 according to the present embodiment, the second brake B2 includes the inner chamber 76 which the first engagement pressure PSL6 is supplied to and discharged from and the outer chamber 77 which the third engagement pressure PL is supplied to and discharged from, and at least one of the first engagement pressure PSL6 and the third engagement pressure PL is supplied and discharged, so that the second brake B2 is engageable and disengageable. The hydraulic control unit 101 includes the signal solenoid valve SC1 that can supply the signal pressure PSC1 and the switching valve 10 that is capable of switching by the signal pressure PSC1 between the first state in which the source pressure is supplied as the third engagement pressure PL to the second engagement oil chamber 77 and the second state in which the supply of the source pressure to the second engagement oil chamber 77 is cut off. In this case, the switching valve 10 outputs the source pressure as the second counter pressure PL, in the second state. This structure can prevent simultaneous occurrence of the supply of hydraulic pressure to the second engagement oil chamber 77 and the establishment of the seventh speed.

Second Embodiment

Figure 7:
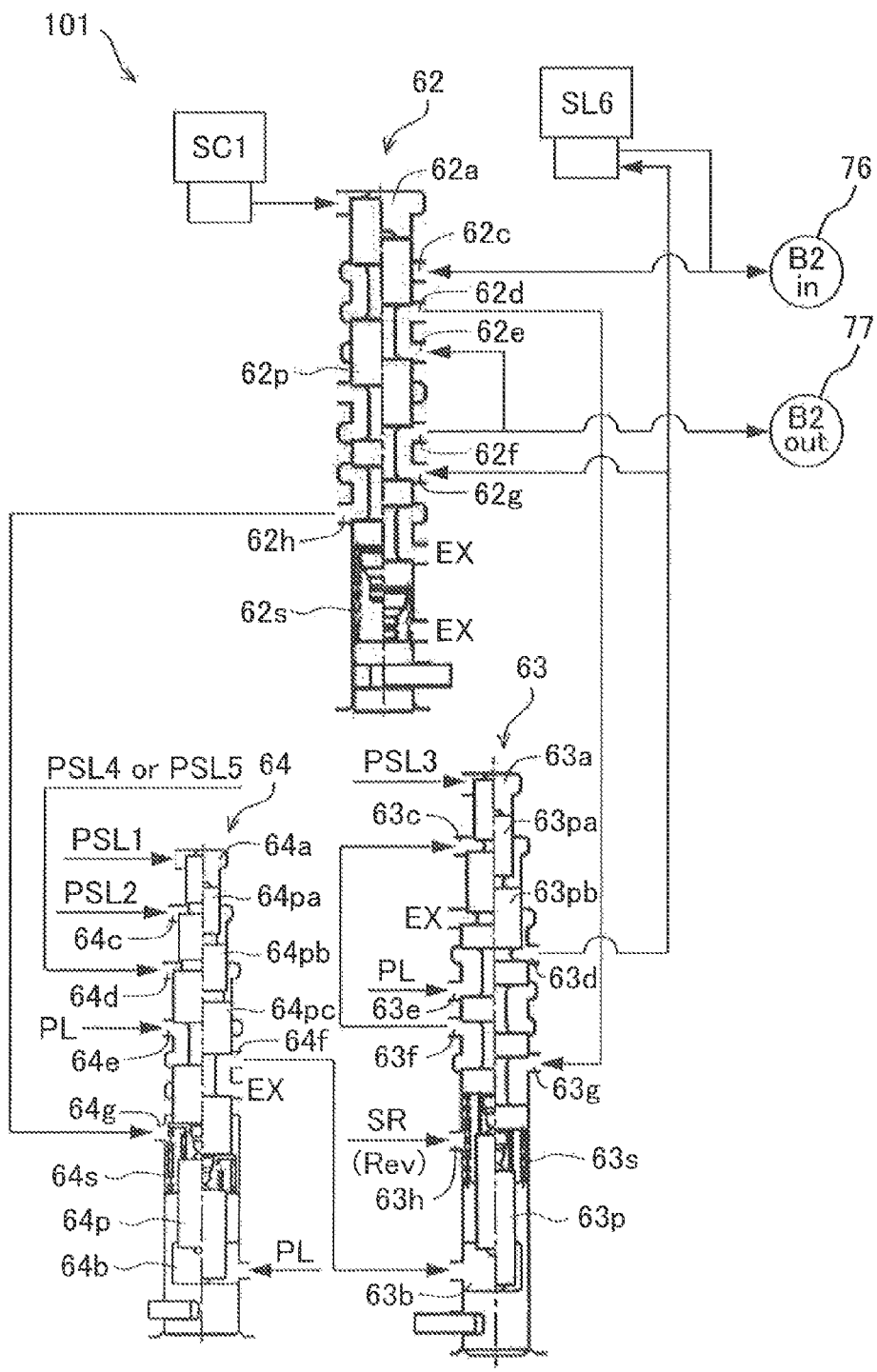
FIG. 7 is a schematic diagram of a hydraulic control device according to a second embodiment of the present disclosure.

Next, the first B2 apply control valve 62, the second B2 apply control valve 63, and the signal pressure switching valve 64 in the hydraulic control unit 101 of the automatic transmission 1 according to a second embodiment of the present disclosure, will be described in detail based on FIG. 7. The overall structure of the hydraulic control circuit 100 is similar to that of the first embodiment, so that the same reference numerals are used, and the detailed description will be omitted.

The first B2 apply control valve 62 includes a spool 62p and a spring 62s for urging the spool 62p upward in the figure, and also includes a first oil chamber 62a above the spool 62p, a first port 62c, a second port 62d, a third port 62e, a fourth port 62f, a fifth port 62g, and a sixth port 62h.

The first oil chamber 62a communicates with the output port of the solenoid valve SC1, and is capable of receiving the signal pressure from the solenoid valve SC1. The first port 62c communicates with the output port of the linear solenoid valve SL6 and the hydraulic servo 76 capable of engaging and disengaging the second brake B2 through the inner chamber, and is capable of receiving the signal pressure from the linear solenoid valve SL6. The second port 62d communicates with a fifth port 63g (to be described later) of the second B2 apply control valve 63. The third port 62e and the fourth port 62f communicate with the hydraulic servo 77 capable of engaging and disengaging the second brake B2 through the outer chamber. The fourth port 62f can supply a hydraulic pressure to the hydraulic servo 77. The fifth port 62g communicates with a second port 63d (to be described later) of the second B2 apply control valve 63 and the input port of the linear solenoid valve SL6. The sixth port 62h communicates with a fifth port 64g (to be described later) of the signal pressure switching valve 64.

An urging force of the spring 62s acts on the spool 62p against the signal pressure from the solenoid valve SC1, and the spool 62p is controlled to be in a high-speed position (left-half position) on the upper side of the figure or in a low-speed position (right-half position) on the lower side of the figure. This structure causes the spool 62p to be switched from the high-speed position to the low-speed position against the spring 62s when the signal pressure is supplied from the solenoid valve SC1 to the first oil chamber 62a. When the spool 62p is in the high-speed position, the first port 62c communicates with the second port 62d, the supply of the hydraulic pressure to the third port 62e is cut off, and the fifth port 62g communicates with the sixth port 62h. When the spool 62p is in the low-speed position, the supply of the hydraulic pressure to the first port 62c is cut off, the second port 62d communicates with the third port 62e, the fourth port 62f communicates with the fifth port 62g, and the sixth port 62h is released.

The second B2 apply control valve 63 includes a spool 63p and a spring 63s for urging the spool 63p upward in the figure, and also includes a first oil chamber 63a above the spool 63p, a second oil chamber 63b below the spool 63p, a first port 63c, the second port 63d, a third port 63e, a fourth port 63f, the fifth port 63g, and a sixth port 63h.

The first oil chamber 63a communicates with the output port of the linear solenoid valve SL3, and is capable of receiving the supply pressure PSL3 supplied from the linear solenoid valve SL3 to the hydraulic servo 73 that can engage and disengage the third clutch C3. The second oil chamber 63b communicates with a fourth port 64f (to be described later) of the signal pressure switching valve 64. The first port 63c communicates with the fourth port 63f. The second port 63d communicates with the fifth port 62g of the first B2 apply control valve 62 and the input port of the linear solenoid valve SL6. The third port 63e is supplied with the line pressure PL. The fifth port 63g communicates with the second port 62d of the first B2 apply control valve 62. The sixth port 63h communicates with the output port of the solenoid valve SR, and is capable of receiving the signal pressure from the solenoid valve SR when the shift speed is Rev.

An urging force of the spring 63s acts on the spool 63p against the signal pressure from the linear solenoid valve SL3, and the spool 63p is controlled to be in a normal position (left-half position) on the upper side of the figure or in a cut-off position (right-half position) on the lower side of the figure. When the spool 63p is in the normal position, the second port 63d communicates with the third port 63e, and the fourth port 63f communicates with the fifth port 63g. When the spool 63p is in the cut-off position, the second port 63d is released, the third port 63e communicates with the fourth port 63f, and the supply of the hydraulic pressure to the fifth port 63g is cut off.

The spool 63p includes a small-diameter land portion 63pa and a medium-diameter land portion 63pb in this order from upward. The first port 63c provides communication between the small-diameter land portion 63pa and the medium-diameter land portion 63pb. The diameter of the spool 63p in the second oil chamber 63b is set equal to that of the small-diameter land portion 63pa. With this structure, when a locking pressure is supplied to the second oil chamber 63b, a supply hydraulic pressure is supplied to the first oil chamber 63a, so that the locking pressure and the supplied hydraulic pressure are cancelled with each other, and, at that time, when the supply hydraulic pressure is supplied to the first port 63c, the spool 63p is switched from the normal position to the cut-off position against the spring 63s. The spool 63p is also switched from the normal position to the cut-off position against the spring 63s when the supply of the locking pressure to the second oil chamber 63b is cut off and the supply hydraulic pressure is supplied to the first port 63c.

The signal pressure switching valve 64 includes a spool 64p and a spring 64s for urging the spool 64p upward in the figure, and also includes a first oil chamber 64a above the spool 64p, a second oil chamber 64b below the spool 64p, a first port 64c, a second port 64d, a third port 64e, the fourth port 64f, and the fifth port 64g.

The first oil chamber 64a communicates with the output port of the linear solenoid valve SL1, and is capable of receiving the supply pressure PSL1 supplied from the linear solenoid valve SL1 to the hydraulic servo 71 that can engage and disengage the first clutch C1. The second oil chamber 64b is supplied with the line pressure PL. The first port 64c communicates with the output port of the linear solenoid valve SL2, and is capable of receiving the supply pressure PSL2 supplied from the linear solenoid valve SL2 to the hydraulic servo 72 that can engage and disengage the second clutch C2. The second port 64d communicates with the output ports of the linear solenoid valves SL4 and SL5 through a three-way valve 65 (refer to FIG. 4), and is capable of receiving higher one of the supply pressure PSL4 supplied from the linear solenoid valve SL4 to the hydraulic servo 74 that can engage and disengage the fourth clutch C4 and the supply pressure PSL5 supplied from the linear solenoid valve SL5 to the hydraulic servo 75 that can engage and disengage the first brake B1. The third port 64e is supplied with the line pressure PL. The fourth port 64f communicates with the second oil chamber 63b of the second B2 apply control valve 63. The fifth port 64g communicates with the sixth port 62h of the first B2 apply control valve 62.

An urging force of the spring 64s acts on the spool 64p against the supply pressures PSL1, PSL2 and one of the supply pressures PSL4 and PSL5, and the spool 64p is controlled to be in a normal position (left-half position) on the upper side of the figure or in a failure position (right-half position) on the lower side of the figure. When the spool 64p is in the normal position, the third port 64e communicates with the fourth port 64f. When the spool 64p is in the failure position, the supply of the hydraulic pressure to the third port 64e is cut off, the fourth port 64f is released, and the supply of the hydraulic pressure to the fifth port 64g is cut off.

The spool 64p includes a small-diameter land portion 64pa, a medium-diameter land portion 64pb, and a large-diameter land portion 64pc in this order from upward. The area ratio of these land portions is such that; small-diameter land portion 64pa:medium-diameter land portion 64pb:large-diameter land portion 64pc=$\frac{1}{3}$:$\frac{2}{3}$:1. The first port 64c provides communication between the small-diameter land portion 64pa and the medium-diameter land portion 64pb. The second port 64d provides communication between the medium-diameter land portion 64pb and the large-diameter land portion 64pc. The diameter of the spool 64p in the second oil chamber 64b is set equal to that of the medium-diameter land portion 64pb. With this structure, when supply hydraulic pressures are supplied to all of the first oil chamber 64a, the first port 64c, and the second port 64d, the supply hydraulic pressures overcome the line pressure PL applied as the locking pressure to the second oil chamber 64b, and the spool 64p is switched from the normal position to the failure position against the spring 64s.

Next, operations of the first B2 apply control valve 62, the second B2 apply control valve 63, and the signal pressure switching valve 64 in the hydraulic control unit 101 of the automatic transmission 1 according to the present embodiment will be described in detail.

When all of the first B2 apply control valve 62, the second B2 apply control valve 63, and the signal pressure switching valve 64 are in the normal positions thereof, setting the shift speed to, for example, the first forward speed operates the linear solenoid valves SL1, SL2, and SL6 and the solenoid valve SC1. Consequently, the supply hydraulic pressure is supplied to the first oil chamber 64a and the first port 64c of the signal pressure switching valve 64. However, the supply hydraulic pressure cannot exceed the pressing force from the second oil chamber 64b, so that the spool 64p is kept in the normal position. As a result, the line pressure PL supplied to the third port 64e is output from the fourth port 64f, and acts as the locking pressure in the second oil chamber 63b of the second B2 apply control valve 63.

In the first B2 apply control valve 62, the signal pressure from the solenoid valve SC1 switches the spool 62p to the low-speed position against the spring 62s. This operation causes the line pressure PL supplied to the third port 63e of the second B2 apply control valve 63 to be supplied from the second port 63d through the linear solenoid valve SL6 to the hydraulic servo 76 for the inner chamber of the second brake B2. The line pressure PL is supplied from the second port 63d through the fifth port 62g and the fourth port 62f of the first B2 apply control valve 62 to the hydraulic servo 77 for the outer chamber of the second brake B2. Consequently, the first clutch C1, the second clutch C2, and the second brake B2 are simultaneously engaged so as to establish the first forward speed.

The line pressure PL is supplied from the second port 63d of the second B2 apply control valve 63 through the fifth port 62g and the fourth port 62f of the first B2 apply control valve 62, and then through the third port 62e and the second port 62d, and further through the fifth port 63g and the fourth port 63f of the second B2 apply control valve 63, to the first port 63c. While this operation causes a downward urging force to be generated to the spool 63p due to a difference in area between the small-diameter land portion 63pa and the medium-diameter land portion 63pb, the spool 63p is kept in the normal position because the locking pressure is applied to the second oil chamber 63b.

Here, an example in which the first and the second apply control valves operate will be described. To change the shift speed from the first forward speed to the second forward speed, the second clutch C2 is disengaged, and the first brake B1 is engaged. If, however, the first brake B1 is engaged while the second clutch C2 is not disengaged due to, for example, valve stick of the linear solenoid valve SL2, the four engagement elements consisting of the first and the second clutches C1 and C2, and the first and the second brakes B1 and B2 are simultaneously engaged, resulting in a combination that causes deceleration exceeding the predetermined value. Hence, to avoid such a simultaneous engagement, the supply of the hydraulic pressure to the second brake B2 is cut off.

In this case, the linear solenoid valves SL1, SL5, and SL6 and the solenoid valve SC1 operate when the shift to the second forward speed is completed. If an ON failure (failure of outputting the hydraulic pressure) occurs in the linear solenoid valve SL2, the supply hydraulic pressures are supplied to the first oil chamber 64a, the first port 64c, and the second port 64d of the signal pressure switching valve 64, and the supply hydraulic pressure exceeds the pressing force from the second oil chamber 64b, so that the spool 64p is switched to the failure position against the spring 64s and the pressing force. This operation releases the locking pressure in the second oil chamber 63b of the second B2 apply control valve 63 that communicates with the fourth port 64f.

In this state, in the second B2 apply control valve 63, the line pressure PL is supplied to the first port 63c to cause the downward urging force to be generated due to the difference in area between the small-diameter land portion 63pa and the medium-diameter land portion 63pb, and the locking pressure in the second oil chamber 63b is released, so that the spool 63p is switched to the cut-off position against the spring 63s. Accordingly, communication between the third port 63e and the second port 63d is cut off, so that the line pressure PL supplied to the third port 63e is not supplied to the linear solenoid valve SL6, and the supply hydraulic pressures to the hydraulic servos 76 and 77 for the second brake B2 are cut off. Thus, the second brake B2 is disengaged. As a result, even if the second clutch C2 cannot be disengaged, the four engagement elements consisting of the first and the second clutches C1 and C2, and the first and the second brakes B1 and B2 are not simultaneously engaged. Accordingly the deceleration is suppressed so as not to exceed the predetermined value. Then, appropriate processing is performed, such as selecting another shift speed.

As described above, according to the hydraulic control unit 101 of the present embodiment, when a combination of engagement elements that causes deceleration of a vehicle to exceed the predetermined value during shifting is adopted, the first and the second B2 apply control valves 62 and 63 and the signal pressure switching valve 64 cut off the supply of hydraulic pressures to the second brake B2. Hence, the hydraulic control unit 101 can be small compared to the case in which a plurality of cut-off valves is provided to cut off the supply of the hydraulic pressures to a plurality of engagement elements. As a result, even if the number of engagement elements increases as in the case of the automatic transmission 1 that can establish the ten forward speeds, the valves 62, 63, and 64 can be provided without causing an increase in the number of components thereof or an increase in the size thereof.

INDUSTRIAL APPLICABILITY

The present drive device can be used in vehicles, such as passenger cars and trucks, and in particular, is preferably used in devices that can cut off the supply of the pressure to a predetermined one of a plurality of predetermined engagement elements such that the engagement elements are prevented from being simultaneously engaged.

The invention claimed is:

1. A hydraulic control device of an automatic transmission including: a first engagement element that is hydraulically operated and is engaged when lower forward shift speeds are established; a second engagement element that is hydraulically operated and is engaged when at least forward shift speeds other than the lower forward shift speeds are established; and a third engagement element, a fourth engagement element, a fifth engagement element and a sixth engagement element that are each hydraulically operated, the first engagement element and the second engagement element being engagement elements that are not simultaneously engaged when any forward shift speed including the lower forward shift speeds and the forward shift speeds is established, and a plurality of shift speeds including the lower forward shift speeds and the forward shift speeds capable of being established by selectively engaging three of the first engagement element, the second engagement element, the third engagement element, the fourth engagement element, the fifth engagement element and the sixth engagement element, the hydraulic control device comprising:
a solenoid valve capable of supplying a first engagement pressure to the first engagement element; and
a first cut valve that is interposed in an oil passage from the solenoid valve to the first engagement element and is capable of cutting off supply of a hydraulic pressure to the first engagement element, wherein
only the first engagement pressure and a second engagement pressure serve as hydraulic pressures that act such that the first cut valve cuts off the supply of the hydraulic pressure to the first engagement element, and
the first cut valve is switched so as to cut off the supply of the hydraulic pressure to the first engagement element when the first engagement pressure and the second engagement pressure are simultaneously supplied to the first engagement element and the second engagement element, respectively.

2. The hydraulic control device of an automatic transmission according to claim 1, wherein
the first engagement element is an engagement element including an engagement oil chamber with a double-chamber structure including a first engagement oil chamber which the first engagement pressure is supplied to and discharged from and a second engagement oil chamber which a third engagement pressure is supplied to and discharged from, and is engageable and disengageable when at least one of the first engagement pressure and the third engagement pressure is supplied and discharged,
the hydraulic control device further includes:
a signal solenoid valve that is capable of supplying a signal pressure; and
a switching valve that is capable of switching by the signal pressure between a first state of being capable of supplying a source pressure as the third engagement pressure to the second engagement oil chamber and a second state of cutting off the supply of the source pressure to the second engagement oil chamber, and the hydraulic control device is structured so as to set the switching valve in the second state when establishing at least the forward shift speeds other than the lower forward shift speeds.

3. The hydraulic control device of an automatic transmission according to claim 2, wherein the first cut valve is supplied with a first counter pressure against one of the first and the second engagement pressures, and the first cut valve is structured so as to:

cut off the supply of the hydraulic pressure to the first engagement element when both the first and the second engagement pressures are applied to the first cut valve, while the first cut valve is supplied with the first counter pressure; and cut off the supply of the hydraulic pressure to the first engagement element when one of the first and the second engagement pressures is applied to the first cut valve, while the first cut valve is not supplied with the first counter pressure.

4. The hydraulic control device of an automatic transmission according to claim 3, further comprising:

a second cut valve that is capable of cutting off the supply of the first counter pressure to the first cut valve when engagement pressures are simultaneously supplied to three engagement elements other than the first and the second engagement elements.

5. The hydraulic control device of an automatic transmission according to claim 4, further comprising:

a first hydraulic pressure supply portion that is capable of supplying the second cut valve with a second counter pressure against the engagement pressures applied to the three engagement elements, when a shift speed is established by simultaneously engaging four engagement elements consisting of the second engagement element and the three engagement elements other than the first and the second engagement elements.

6. The hydraulic control device of an automatic transmission according to claim 5, wherein the first and the second engagement elements are simultaneously engaged when a reverse shift speed is established; and the hydraulic control device further includes a second hydraulic pressure supply portion that is capable of supplying a third counter pressure against the first and the second engagement pressures to the first cut valve, when the reverse speed is established.

7. The hydraulic control device of an automatic transmission according to claim 5, wherein the first engagement element includes a first engagement oil chamber which the first engagement pressure is supplied to and discharged from and a second engagement oil chamber which the second engagement pressure is supplied to and discharged from, and is engageable and disengageable when at least one of the first engagement pressure and the second engagement pressure is supplied and discharged, the first hydraulic pressure supply portion includes:

a first signal solenoid valve that is capable of supplying a first signal pressure; and a switching valve that is capable of switching by the first signal pressure between a first state of being capable of supplying a source pressure as the second engagement pressure to the second engagement oil chamber and a second state of cutting off the supply of the source pressure to the second engagement oil chamber, wherein the switching valve outputs the source pressure as the second counter pressure, in the second state.

8. The hydraulic control device of an automatic transmission according to claim 1, wherein the first cut valve is supplied with a first counter pressure against one of the first and the second engagement pressures, and the first cut valve is structured so as to:

cut off the supply of the hydraulic pressure to the first engagement element when both the first and the second engagement pressures are applied to the first cut valve, while the first cut valve is supplied with the first counter pressure; and cut off the supply of the hydraulic pressure to the first engagement element when one of the first and the second engagement pressures is applied to the first cut valve, while the first cut valve is not supplied with the first counter pressure.

9. The hydraulic control device of an automatic transmission according to claim 1, wherein the first and the second engagement elements are simultaneously engaged when a reverse shift speed is established; and the hydraulic control device further includes a second hydraulic pressure supply portion that is capable of supplying a third counter pressure against the first and the second engagement pressures to the first cut valve, when the reverse speed is established.

* * * * *